(12) United States Patent
Izumi

(10) Patent No.: US 7,725,040 B2
(45) Date of Patent: May 25, 2010

(54) WAVELENGTH DIVISION MULTIPLEXING TRANSMISSION DEVICE

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 11/239,055

(22) Filed: Sep. 30, 2005

(65) Prior Publication Data

US 2006/0216026 A1  Sep. 28, 2006

(30) Foreign Application Priority Data

Mar. 28, 2005  (JP)  ............... 2005-093287

(51) Int. Cl.
*H04B 10/02* (2006.01)
(52) U.S. Cl. .......................... 398/175; 398/83; 398/168
(58) Field of Classification Search .................. 398/83, 398/84, 85, 90, 155, 168, 175, 176
See application file for complete search history.

(56) References Cited

U.S. PATENT DOCUMENTS

| 5,790,287 | A | * | 8/1998 | Darcie et al. ................. 398/108 |
| H1791 | H | * | 3/1999 | Williams .................... 385/140 |
| 6,222,654 | B1 |  | 4/2001 | Frigo |
| 6,476,953 | B1 | * | 11/2002 | Morkel ........................ 398/175 |
| 6,498,671 | B1 |  | 12/2002 | Janz et al. |
| 6,782,204 | B1 |  | 8/2004 | Thomas et al. |

FOREIGN PATENT DOCUMENTS

| EP | 0 297 504 | 1/1989 |
| JP | 04-336829 | 11/1992 |
| JP | 07-177556 | 7/1995 |
| JP | 11-178019 | 7/1999 |
| JP | 11-261532 | 9/1999 |
| JP | 2001-197006 | 7/2001 |
| JP | 2003-501943 | 1/2003 |
| JP | 2003-188821 | 7/2003 |
| JP | 2004-046118 | 2/2004 |

OTHER PUBLICATIONS

Chinese Office Action issued Aug. 21, 2009 in Application No. 200510084467.X, (13 pages).
European Search Report issued on Nov. 13, 2009 in corresponding European Patent Application No. 05012869.3.
Japanese Office Action issued Feb. 2, 2010 in corresponding Japanese Application No. 2005-093287.

* cited by examiner

*Primary Examiner*—Nathan M Curs
(74) *Attorney, Agent, or Firm*—Staas & Halsey LLP

(57) ABSTRACT

In an optical transmission device, when wavelength division multiplexed light formed from signals of a plurality of wavelengths are received, an optical signal of one wavelength comprised in this wavelength division multiplexed light is planarized and non-signal light of the same wavelength is reproduced. The reproduced light is modulated with a transmission data string, an optical signal is generated, and a wavelength division multiplexed light comprising the generated optical signal is transmitted.

8 Claims, 34 Drawing Sheets

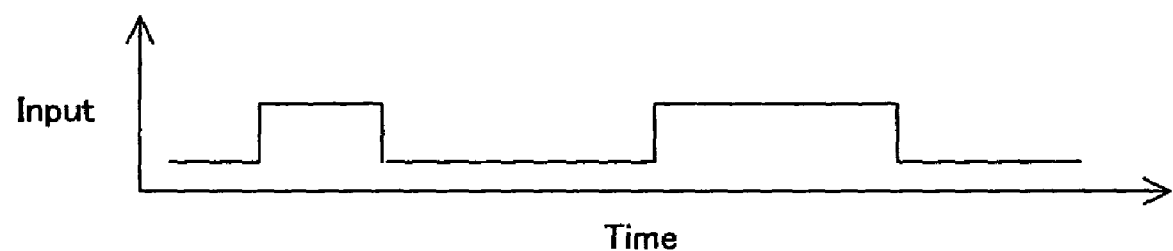
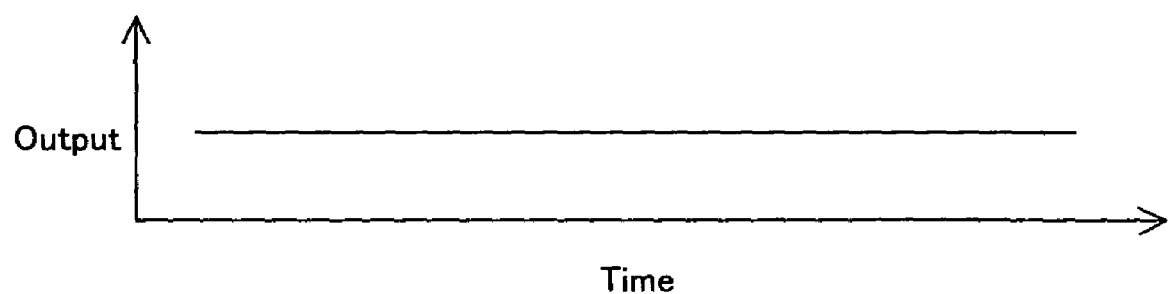
Fig. 4

WAVELENGTH DIVISION MULTIPLEXING TRANSMISSION DEVICE

BACKGROUND OF THE INVENTION

1. Field of the Invention

The present invention relates to a device for transmitting optical signals through wavelength division multiplexing using multi-wavelength light provided by a multi-wavelength light source.

2. Description of the Related Art

Presently, Wavelength Division Multiplexing (WDM) communication technology is being put to practical use and the transmission capacity of optical communication is growing significantly (for example, refer to Patent References 1 to 5, below). In the future, it will become necessary to further increase communication capacity due to the progression of the trend towards making all of the transmission paths of subscriber systems fiber-optic.

Patent Reference 1 Japanese Patent Publication No. 2001-197006

Patent Reference 2 Japanese Patent Publication No. 11-261532

Patent Reference 3 Japanese Patent Publication No. 04-336829

Patent Reference 4 Japanese Patent Publication No. 07-177556

Patent Reference 5 PCT International Patent Application Translation Publication No. 2003-50194

FIG. 1A is a block diagram of a WDM transmission system such as this. The WDM transmission system in FIG. 1A is constructed of a terminal station A, a relay station B, and a terminal station C. Station A comprises transmitting units 11-1 to 11-5, receiving units 12-1 to 12-5, and a wavelength multiplexing/separation device 13-1. Station C comprises transmitting units 11-16 to 11-20, receiving units 12-16 to 12-20, and a wavelength multiplexing/separation device 13-4. Station B comprises transmitting units 11-6 to 11-15, receiving units 12-6 to 12-15, wavelength multiplexing/separation devices 13-2 and 13-3, and an electrical ADD/DROP device 14.

The transmitting units 11-1 to 11-20, as shown in FIG. 1B, each comprise a light source 21 of a predetermined wavelength and a modulator 22, and generate optical signals by modulating light from the light source 21 with a transmission data string. The wavelength multiplexing/separation device 13-1 to 13-4 comprises a wavelength multiplexing unit 15, a wavelength separation unit 16, a light transmitting amplification unit 17, and a light receiving amplification unit 18.

The optical signals of each wavelength output from the transmitting units 11-1 to 11-5 of station A are multiplexed by the wavelength multiplexing/separation device 13-1 and transmitted to station B as WDM light. At station B, the received WDM light is separated into optical signals of each wavelength by the wavelength multiplexing/separation device 13-1 and converted into electrical signals by the receiving unit 12-1 to 12-5. The electrical ADD/DROP device 14 divides (DROP) a portion of the received signals and inserts (ADD) other transmission data string.

Next, the WDM light is transmitted from station B to station C in the same way as transmission from station A to station B, and the optical signals of each wavelength are received by the receiving units 12-16 to 12-20 of station C. The transmission procedure from station C to station A is the same as the transmission procedure from station A to station C.

In a WDM transmission system such as this, in order to increase the communication capacity of the entire system, the number of wavelengths can be increased relatively easily. However, if the wavelength band is widened relentlessly, transmission becomes impossible due to limitations of the optical amplification band, the optical fiber transmission band, the optical device band and the like. Therefore, because the wavelength band per se is limited to the most efficient width, the number of wavelengths must be increased by narrowing the distance between wavelengths instead.

In the optical transmitting amplification unit 17 and the optical receiving amplification unit 18, the gain bandwidth of a general multi-wavelength EDFA (Erbium Doped Fiber Amplifier) assigned for each band of L-band, C-band, S-band, and the like is approximately 28 to 32 nm. Therefore, as shown in FIG. 1C, the number of multiplexed wavelengths multiplex varies depending on how many wavelengths are fitted into the range of this gain wavelength band.

At this time, as a factor interfering with the increase in the number of wavelengths, the accuracy of each light sources wavelength becomes an issue. As shown in FIG. 1A and 1B, if optical signals are generated by installing the light source of each wavelength independently into each transmitting unit, an error of $\Delta \lambda$ cont occurs in the self-sustaining oscillation accuracy of each wavelength, as shown in FIG. 1D.

In addition, unsurprisingly production tolerance issues occur in the transmission characteristics of the optical device (wavelength filter) implemented as the wavelength multiplexing unit 15 or the wavelength separation unit 16, such as an Arrayed Wavelength Grating (AWG), for example.

For example, the transmission characteristics when WDM light is incident on port P3 of a wavelength filter as in FIG. 1E and optical signals with a wavelength of $\lambda 1$ and $\lambda 2$ are respectively output from port P1 and port P2 are as shown in FIG. 1F. In FIG. 1F, the curved line 31 indicates light attenuation from port P3 to port P1, and the curved line 32 indicates light attenuation from port P3 to port P2. In order to separate these optical signals using the wavelength filter, $\lambda 1$ and $\lambda 2$ must be $\Delta \lambda$ filter apart, after taking production tolerance into consideration.

Furthermore, under the presumption that the optical spectrum widens by $\Delta \lambda$ mod due to modulation, the following condition applies to the wavelength separation $\Delta \lambda$ of $\lambda 1$ and $\lambda 2$.

$$\Delta\lambda > \Delta\lambda cont + \Delta\lambda \text{filter} + \Delta\lambda \text{ mod} \quad (1)$$

In this way, if the factors production tolerance in the wavelength accuracy and wavelength filter of the light source are taken into consideration, it becomes clear that there are limits to the method of narrowing the distance between wavelengths. On the other hand, a method for increasing the number of wavelengths without narrowing the distance between wavelengths by widening the optical amplification band using Raman amplification technology is also being considered.

In addition, if the number of wavelengths increases, it becomes necessary to prepare the same number of laser oscillators which emit light of accurately differing wavelengths as the number of wavelengths with adequate intervals between wavelengths, and the cost for this section will make up the majority of the cost of the entire system.

Therefore, in order to support the significant increase in communication capacity, it is effective to reconsider the construction of the light source and reduce costs. One method for this can be providing multi-wavelength light to a plurality of stations from multi-wavelength light sources.

FIG. 1G is a block diagram of a WDM transmission system using a multi-wavelength light source such as this. The WDM transmission system in FIG. 1G has a construction wherein the transmitting units 11-1 to 11-20 in the construction in FIG. 1A are replaced with transmitting units 42-1 to 42-20, wavelength separator 41-1 to 41-4 are added to station A to station C, an optical coupler 43 is added to station B, and furthermore, a station D is added.

Transmitting units 42-1 to 42-20 have, as shown in FIG. 1H, a construction wherein the light source 21 is eliminated from the construction of FIG. 1B, and optical signals are generated by modulating light input externally with transmission data string. Station D comprises a multi-wavelength light source providing device 44, and multi-wavelength light which is continuous wave (CW) light comprising light of multiple-wavelengths is provided to station A to station C. The optical coupler 43 of station B divides the provided multi-wavelength light into two and outputs the lights to wavelength separators 41-2 and 41-3, respectively.

At station A, the wavelength separator 41-1 separates the provided multi-wavelength light into light of each wavelength, and outputs it to transmitting units 42-1 to 42-5. In the same way, the wavelength separators 41-2 to 41-4 of station B and station C also fulfill the role of separating the multi-wavelength light provided by the multi-wavelength light source providing device 43 in to light of each wavelength.

Multi-wavelength light generated by one multi-wavelength light source can maintain a separation between wavelengths even after passing through wavelength separators 41-1 to 41-4. Therefore, there is no need to take into consideration the oscillation accuracy error of $\Delta\lambda$ cont, described above. In addition, because it is not necessary to have a laser oscillator for each transmitting unit, the cost of the light source section of the system as a whole can be reduced.

Furthermore, in recent years, multi-wavelength batch conversion technologies, such as those represented by the commercialization of Photonic Crystal Fiber (PCF) and Periodically Poled Lithium Niobate (PPLN) as multi-wavelength conversion element, are being developed. The usage of these new technologies is undeveloped territory, and future market expansion is expected.

However, in the WDM transmission system utilizing the fore-going multi-wavelength light source, the following issues exist.

In the WDM transmission system utilizing the multi-wavelength light source in FIG. 1G, it is necessary to provide a separate optical fiber for multi-wavelength light provision, in comparison to the conventional WDM transmission system in FIG. 1A.

However, if in fact there is no suitable optical fiber, in order to use the wavelength already used in station A in station B, the only method would be to assign the light source of this wavelength to the transmitting unit of station B and modulate, separately, as with station B in the construction in FIG. 1A.

For example, as shown in FIG. 1I, if four stations, station A to station D, are positioned in a ring configuration, station A can separate and modulate the multi-wavelength light provided from the multi-wavelength light source providing device 51 into light of each wavelength and transmit each wavelength to the adjacent lower station B or station C. However, if the lower station which received the modulated light uses the same wavelength, the light source for this wavelength must be provided within this station.

In addition, as shown in FIG. 1J, if three stations, station A to station C, are positioned in a back to back configuration, station A and station C on both ends can separate and modulate the multi-wavelength light provided from the multi-wavelength light source providing devices 61 and 62 into light of each wavelength and transmit them to the adjacent lower station B. However, if the lower station B which received the modulated light uses the same wavelength, the light source for this wavelength must be provided within this station.

However, if the light source is provided independently of the multi-wavelength light source providing device, it becomes necessary to design taking into consideration the production tolerance of this light source, as stated above, and in comparison to a system such as that in FIG. 1G, measures such as further narrowing the separation between wavelengths become difficult.

SUMMARY OF THE INVENTION

An object of the present invention is to curb the additional cost of optical fiber for providing multi-wavelength light in a WDM transmission system using a multi-wavelength light source without setting up light sources for every wavelength in each station.

The transmission device according to the present invention comprises a receiving device, a planarizing device, a modulation device, and a transmitting device.

The receiving device receives wavelength division multiplexed light formed from optical signals of a plurality of wavelengths. The planarizing device planarizes the optical signal of one wavelength comprised in this wavelength division multiplexed light and reproduces non-signal light of the same wavelength. The modulation device modulates the reproduced light with transmission data strings and generates optical signals, and the transmission device transmits wavelength division multiplexed light comprising the reproduced optical signal.

BRIEF DESCRIPTION OF THE DRAWINGS

FIG. 4 is a diagram showing the input/output of the Fabry-Perot optical resonator;

DESCRIPTION OF THE PREFERRED EMBODIMENTS

The preferred embodiments of the present invention are explained in detail below, with reference to the drawings.

Figure 1A:
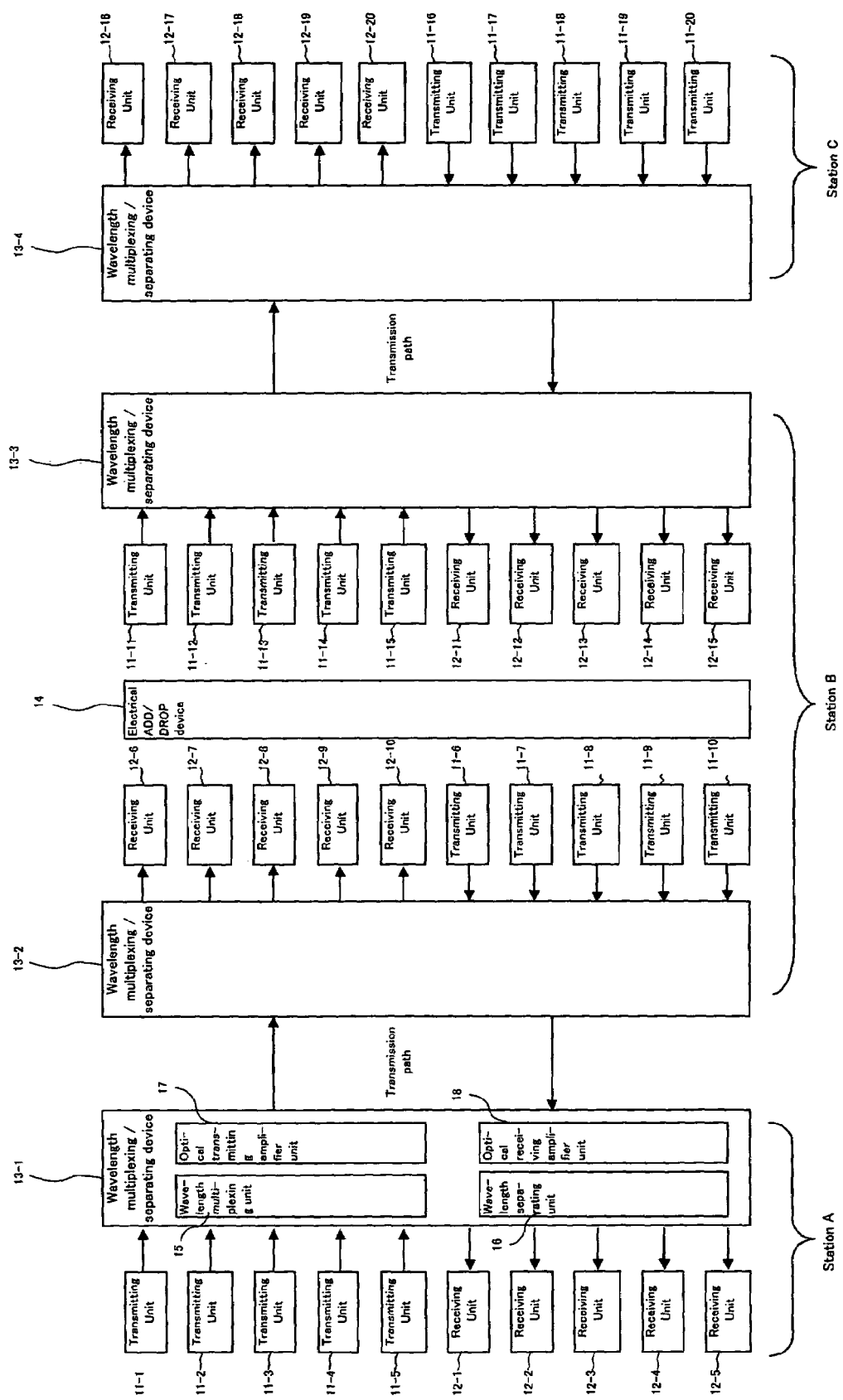
FIG. 1A is a block diagram of a WDM transmission system using light sources for every wavelength.
Figure 1B:
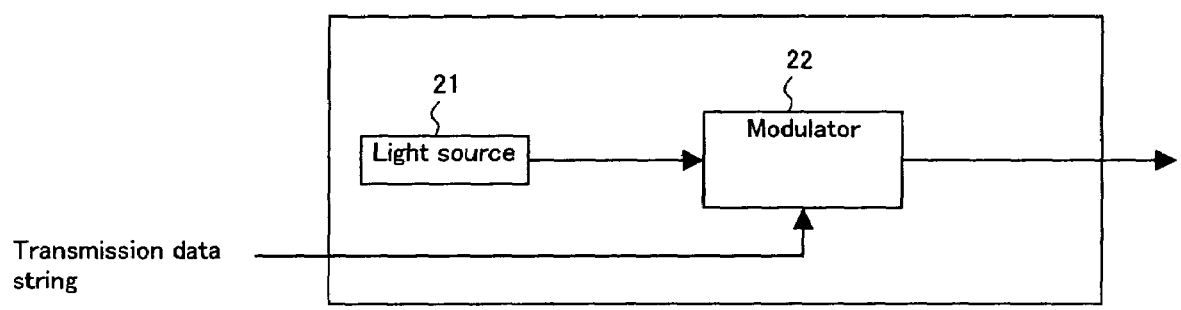
FIG. 1B is a block diagram of a first transmitting unit.
Figure 1C:
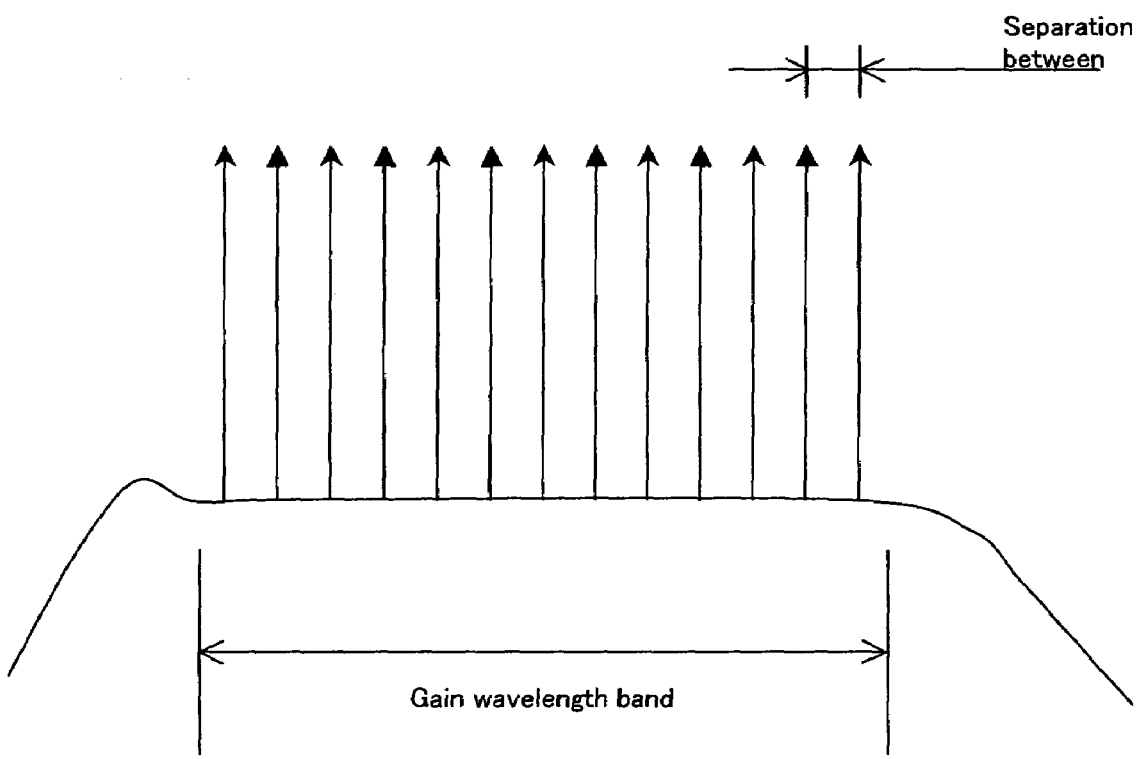
FIG. 1C is a diagram showing the gain wavelength band.
Figure 1D:
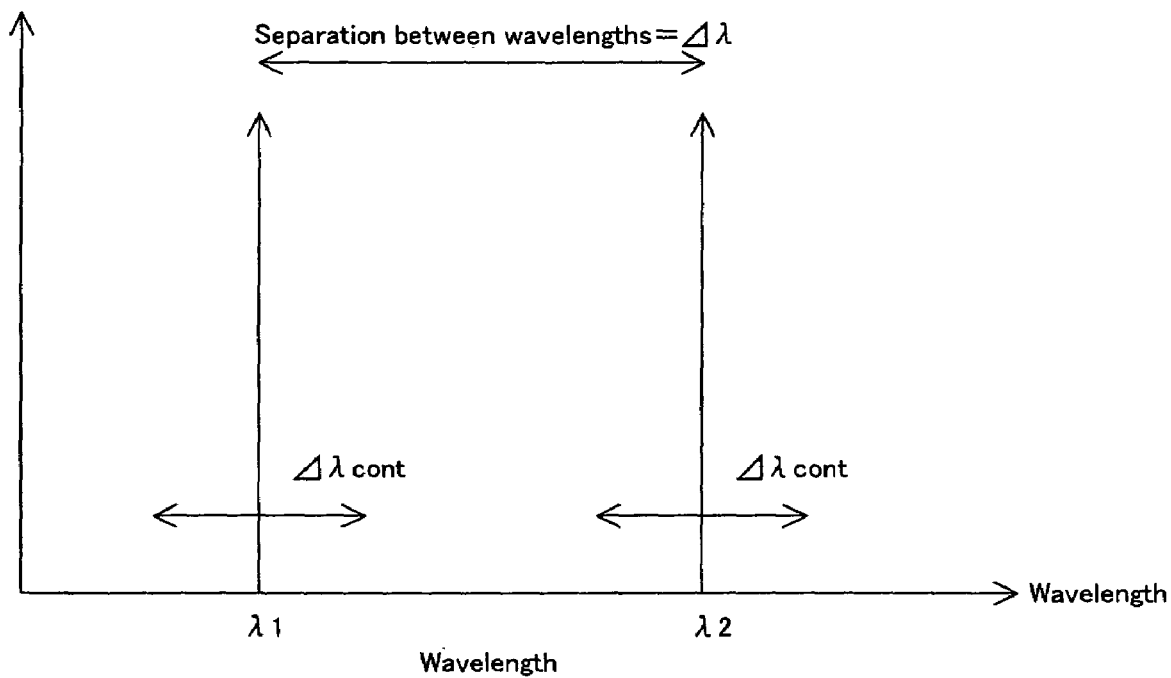
FIG. 1D is a diagram showing dispersion in wavelength accuracy.
Figure 1E:
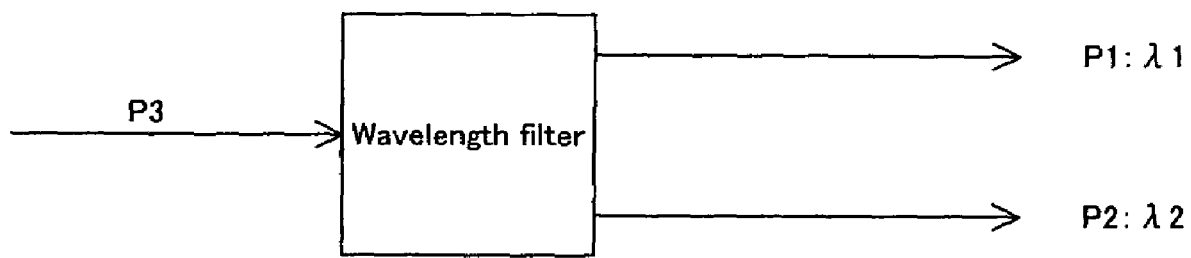
FIG. 1E is a diagram showing a wavelength filter.
Figure 1F:
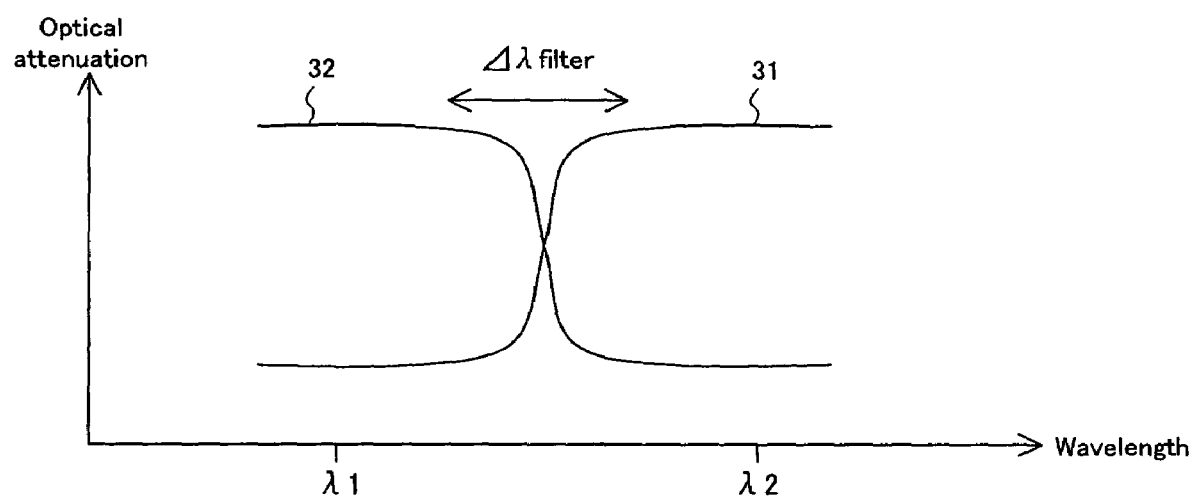
FIG. 1F is a diagram showing the transmission characteristics of the wavelength filter.
Figure 1G:
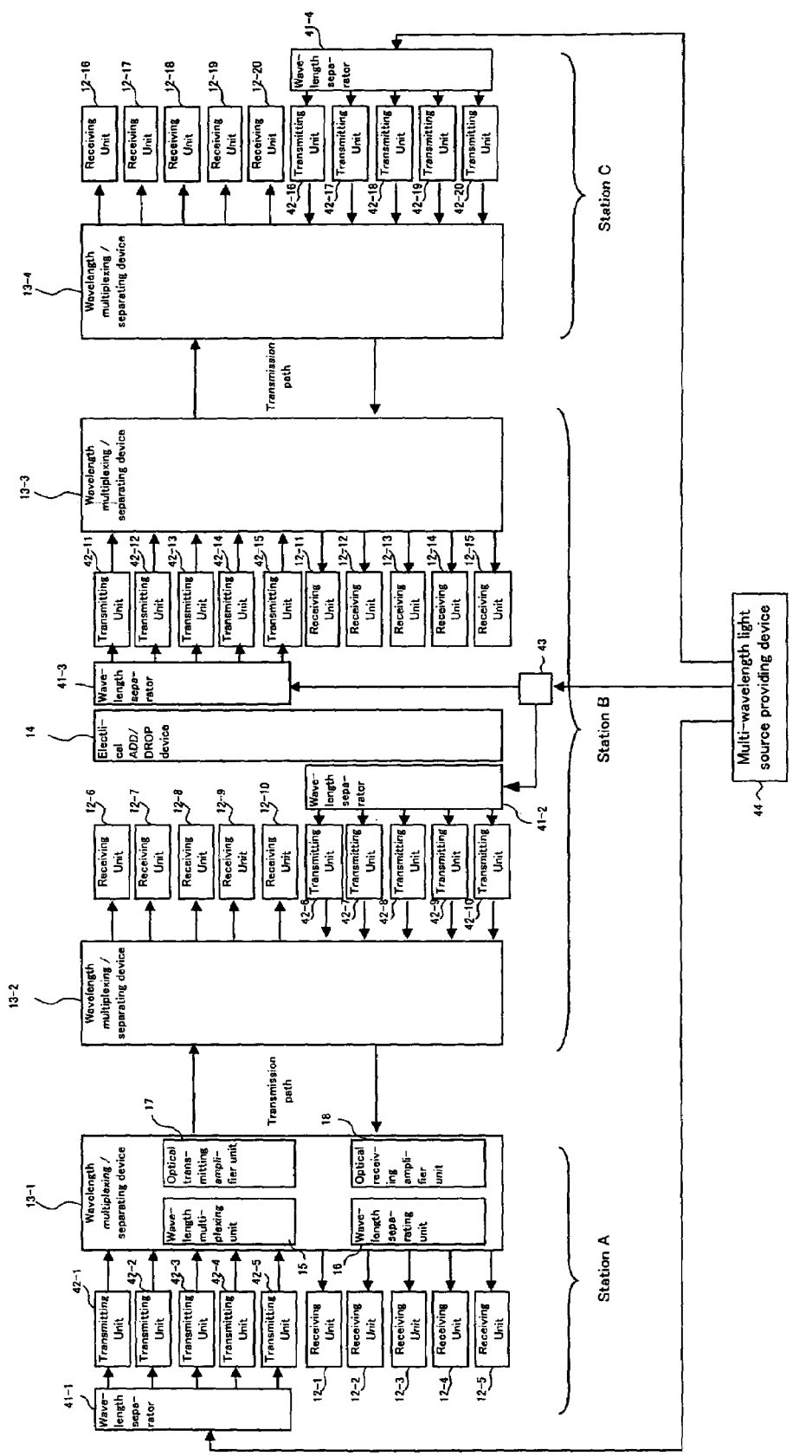
FIG. 1G is a block diagram of a WDM transmission system using multi-wavelength light sources.
Figure 1H:
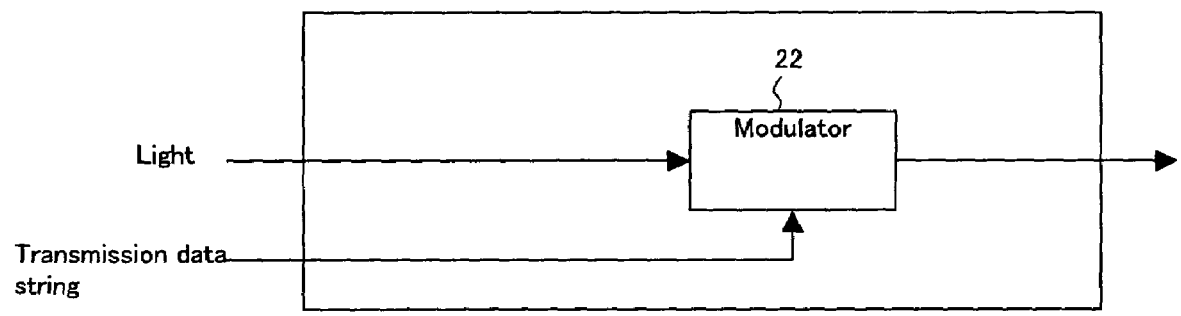
FIG. 1H is a block diagram of a second transmitting unit.
Figure 1:
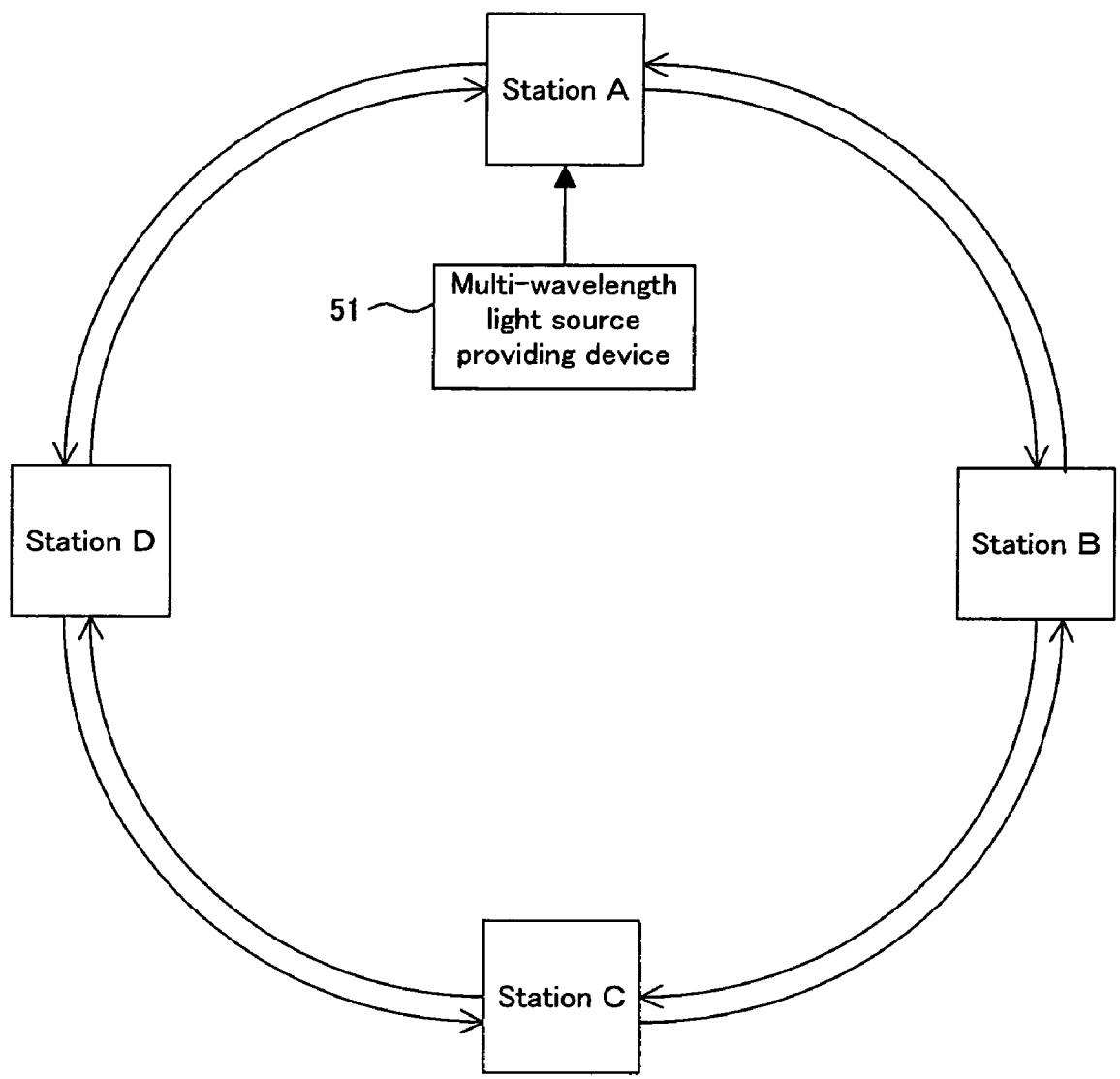
FIG. 1I is a diagram showing a ring configuration.
FIG. 1J is a diagram showing a back to back configuration.
Figure 1J:
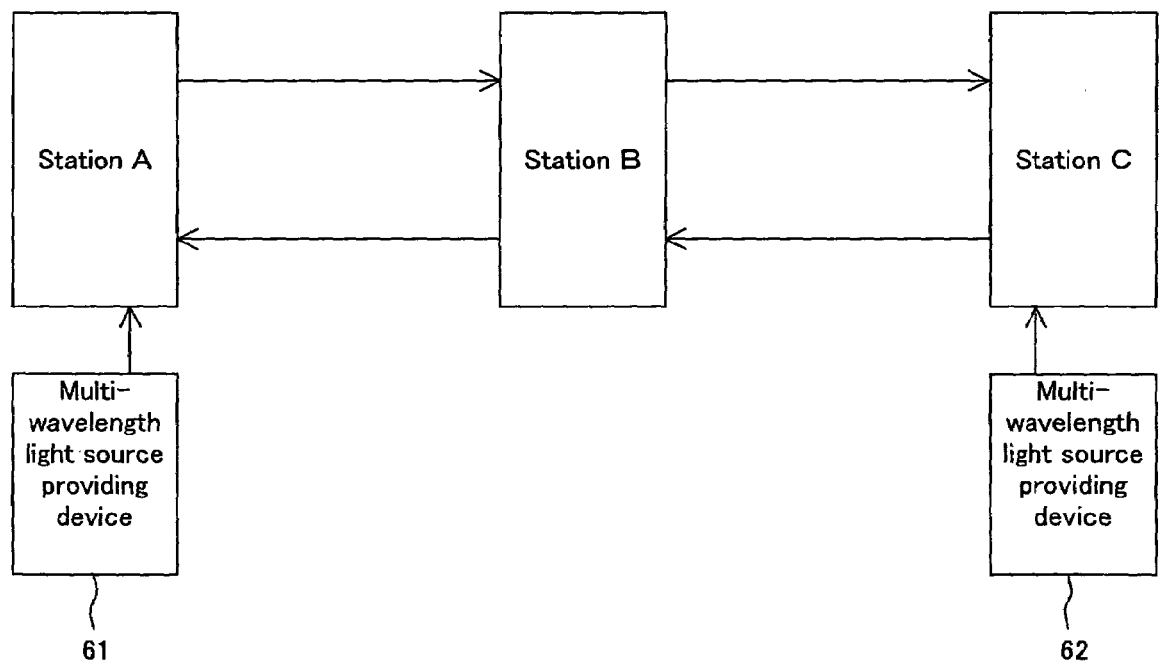
Figure 2A:
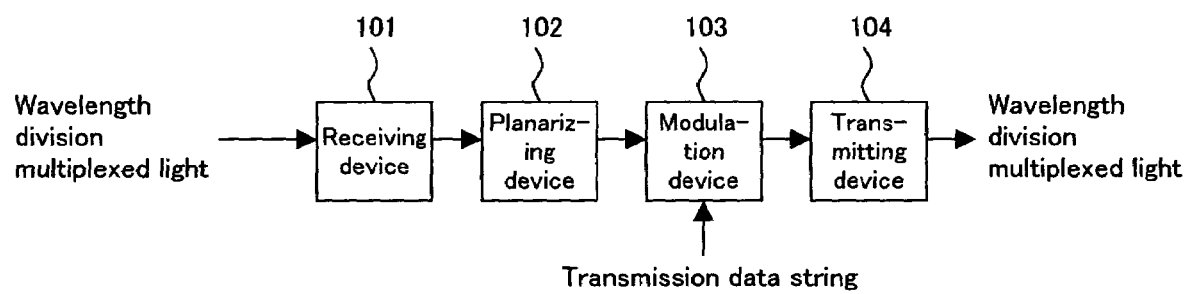
FIG. 2A is the principle diagram of the transmission device of the present invention.

FIG. 2A is the principle diagram of a transmission device according to the present invention. The transmission device in FIG. 2A comprises a receiving device 101, a planarizing device 102, a modulation device 103, and a transmitting device 104.

The receiving device 101 receives wavelength division multiplexed light formed from optical signals of a plurality of wavelengths. The planarizing device 102 planarizes the optical signal of one wavelength comprised in this wavelength division multiplexed light and reproduces non-signal light of the same wavelength. The modulation device 103 modulates the reproduced light with transmission data strings and generates optical signals, and the transmitting device 104 transmits wavelength division multiplexed light comprising the reproduced optical signal.

By comprising the planarizing device 102, even if the wavelength has already been used in an upper transmission device to generate optical signals, non-signal CW light of the same wavelength can be reproduced from this optical signal. The modulation device 103 uses the reproduced CW light as a light source and generates optical signals modulated with transmission data strings. Therefore, there is no need to set up light sources for every wavelength within the transmission device, and there is also no need to set up optical fiber for directly providing multi-wavelength light from a multi-wavelength light source.

The receiving device 101 and transmitting device 104 correspond respectively to, for example, the reception amp 201 and transmission amp 209 in FIG. 2B and FIG. 16 to FIG. 20, described hereafter. The planarizing device 102 corresponds, for example, to the planarizing unit 205 in FIG. 2B, the planarizing unit 1608 in FIG. 16, or the planarizing unit 1706 in FIG. 17 to FIG. 20. The modulation device 103 corresponds, for example, to the modulator 207 in FIG. 2B, the modulator 1607 in FIG. 16, or the modulator 1706 in FIG. 17 to FIG. 20.

According to the present invention, in the WDM transmission system using a multi-wavelength light source, a wavelength which has already been used in data transmission can be reused as a light source. Therefore, a high-capacity WDM transmission system with a narrowed separation between wavelengths can be realized without adding optical fiber connecting multi-wavelength light sources and each transmission device one to one and without setting up light sources for every wavelength other than the multi-wavelength light source.

In a WDM transmission system implementing the Intensity Modulation-Direct Detection system, if unmodulated CW light can be generated by reusing modulated light used in a certain interval, out of a plurality of the lights of each wavelength generated by a multi-wavelength light source, re-modulation of this wavelength can be performed. Therefore, unmodulated CW light can be generated by applying modulated light to an optical resonator which takes into consideration the rules of signal coding, making the amplitude constant.

Figure 2B:
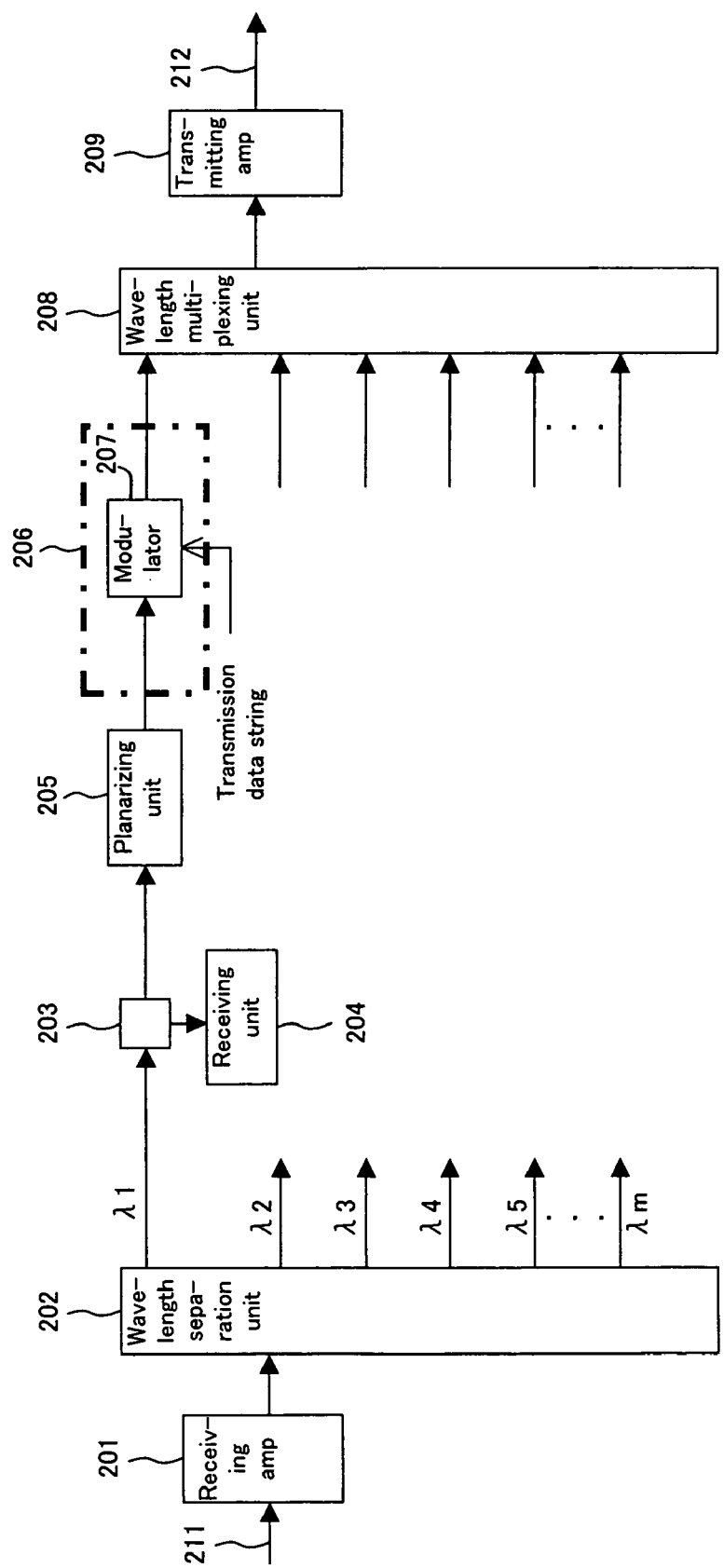
FIG. 2B is a block diagram of a first transmission device.

FIG. 2B shows a construction example of a transmission device set up in each station of a WDM transmission system such as this. The transmission device of FIG. 2B comprises a reception amp 201, a wavelength separation unit 202, an optical coupler 203, a receiving unit 204, a planarizing unit 205, a transmitting unit 206, a wavelength multiplexing unit 208, and a transmission amp 209.

The reception amp 201 amplifies WDM light emitted from optical fiber 211 and outputs the light to the wavelength separation unit 202. The wavelength separation unit 202 separates WDM light from the reception amp 201 into m number of wavelengths $\lambda 1$ to $\lambda m$ and outputs the optical signal of wavelength $\lambda 1$ to the optical coupler 203. The optical coupler 203 divides this optical signal into two and outputs these signals to receiving unit 204 and planarizing unit 205, respectively. The receiving unit 204 converts the optical signal from the optical coupler 203 to an electrical signal.

The planarizing unit 205 planarizes the amplitude of the optical signal from the optical coupler 203, generating CW light which has a peak at wavelength $\lambda 1$, and outputs this light to the transmitting unit 206. The transmitting unit 206 comprises a modulator 207, and generates an optical signal by modulating CW light from the planarizing unit 205 with transmission data string, and outputs the signal to the wavelength multiplexing unit 208.

Reception, planarization, and modulation are performed for optical signals of wavelength $\lambda 2$ to $\lambda m$ output from the wavelength separation unit 202 by the same construction as the optical signal of wavelength $\lambda 1$, and the generated optical signal is output to the wavelength multiplexing unit 208.

The wavelength multiplexing unit 208 multiplexes optical signals from m number of transmitting units including transmitting unit 206, generates a WDM light, and outputs this light to a transmission amp 209. The transmission amp 209 amplifies WDM light from the wavelength multiplexing unit 208 and outputs this to optical fiber 212. The generated WDM light is transmitted to the transmission device of the next station in this way.

In the generation of optical fiber communication signals, information which has been scrambled is generally used for modulation. This is due to characteristics of the receiving unit such as continuous zeros tolerance and guarantees that a signal wherein the same value will not continue for more than a certain period of time is generated.

Figure 3:
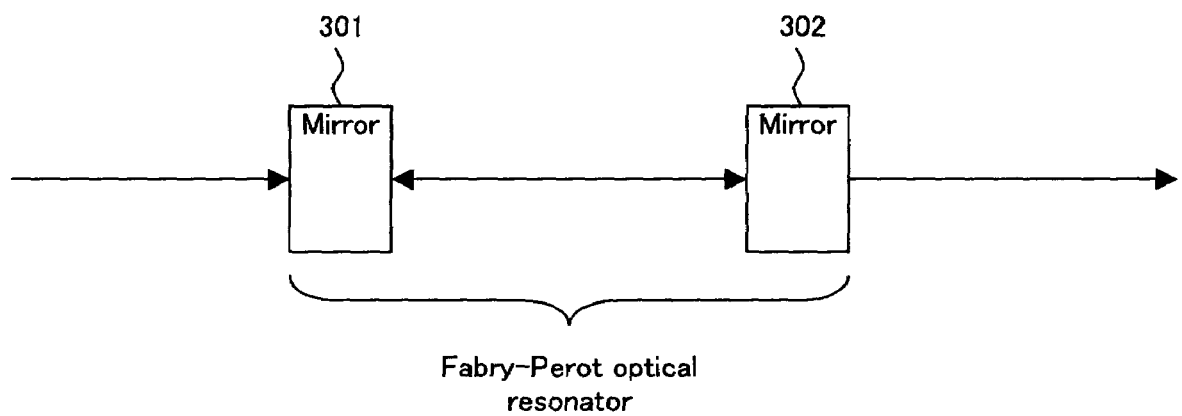
FIG. 3 is a diagram showing a Fabry-Perot optical resonator.

In order to reproduce CW light from an optical signal such as this, the planarizing unit 205 comprises a Fabry-Perot optical resonator as shown in FIG. 3. This optical resonator has a resonator structure with a longer period than the wavelength of the incident light, modulated light incident on mirror 301 reflects and resonates between mirror 301 and mirror 302, and outputs CW light which peaks at the same wavelength as the incident light from mirror 302. At this time, by designing to ensure that the average time from when light is emitted to when it exits is sufficiently longer than the aforementioned predetermined time, the average output of the optical resonator can be made constant.

Figure 5:
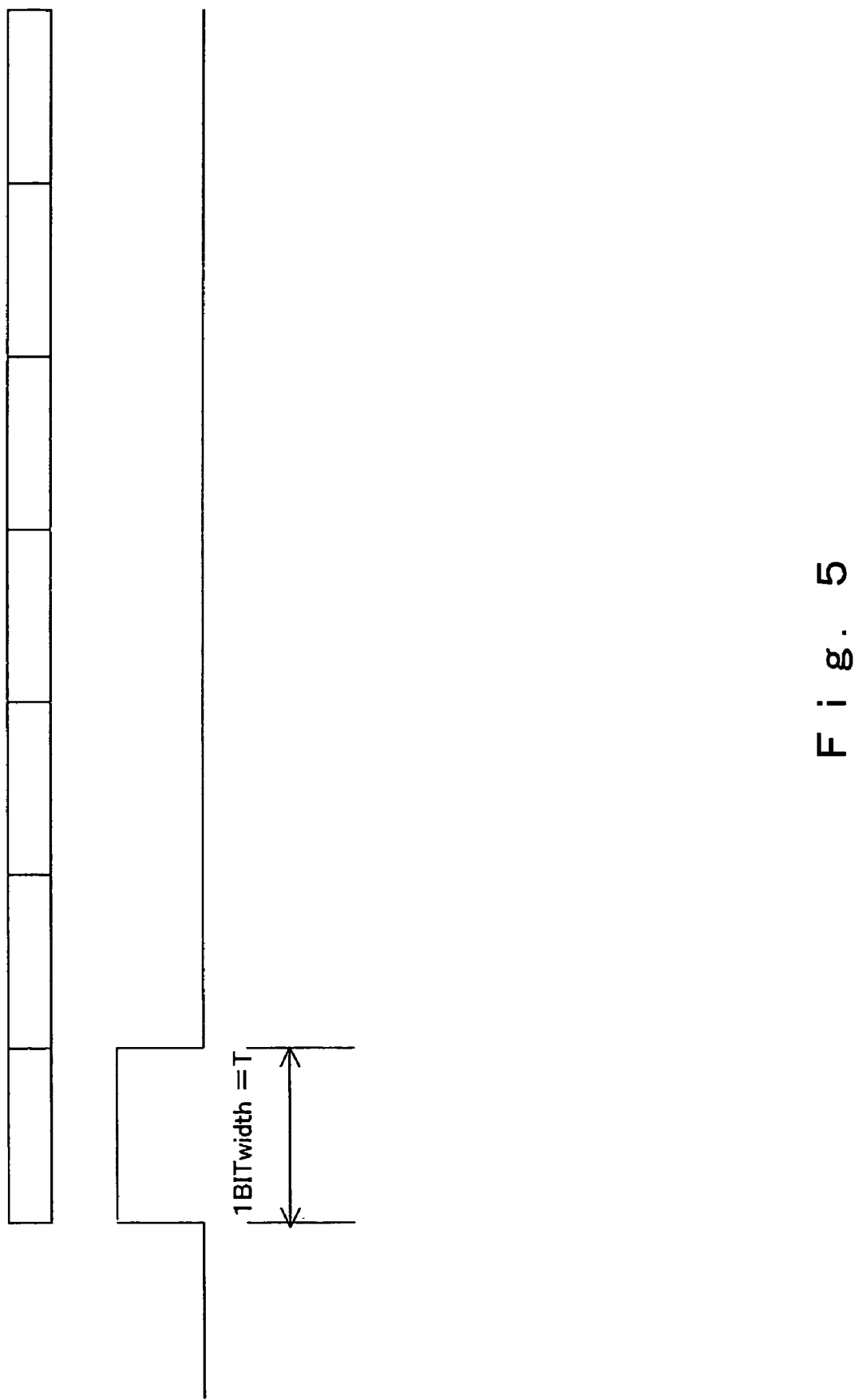
FIG. 5 is a diagram showing a time slot.

FIG. 4 shows the input/output correlation of the optical resonator in FIG. 3, and FIG. 5 shows the time slot length (bit width) T of a 1-bit signal. Here, by setting the resonant frequency of the optical resonator to a value greater than the frequency corresponding to about ¼ of the period of the time slot (bit width) T, waveform distortion of the incident light is planarized. Furthermore, the reflectance of the two mirrors is adjusted such that the average round trip distance of light is a length equivalent to a sufficient number of bits.

At this time, the correlation between the resonator length L, which is equivalent to the distance between the two mirrors, and the time slot length T is expressed in the equation below.

$$2L/(c/n) < T/4 \quad (2)$$

Here, c indicates the velocity of light and n indicates the refractive index of the medium between the mirrors. Equation (2) can be rewritten as below:

$$L < (T/8)*(c/n) \quad (3)$$

In general, although light loss occurs to some extent in a resonator structure such as that in FIG. 3, if a Fabry-Perot laser diode is used simultaneously, this light loss can be compensated and the output can reproduce light of a consistent and equal wavelength. Furthermore, because this Fabry-Perot laser diode can accommodate wavelength bands to a certain extent, it can be switched dynamically and used for channels requiring planarization on a timely basis.

Figure 6:
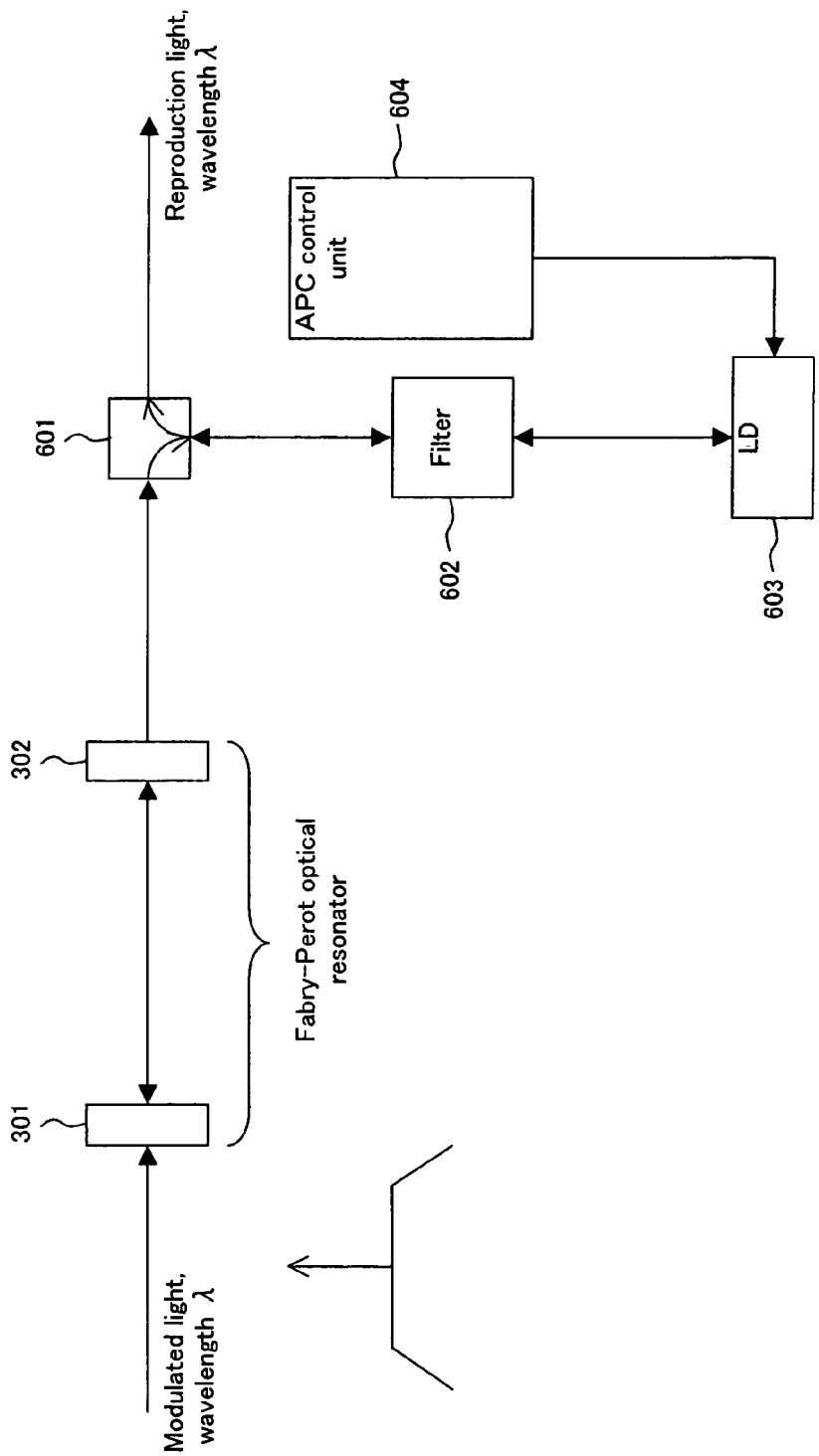
FIG. 6 is a block diagram of a first planarizing unit using laser diode.

FIG. 6 is a construction example of the planarizing unit 205 using a laser diode such as this. The planarizing unit in FIG. 6 comprises, in addition to the Fabry-Perot optical resonator in FIG. 3, an optical circulator 601, a wavelength filter 602, a Fabry-Perot laser diode (LD) 603, and an APC (Automatic Power Control) control unit 604.

Light output from mirror 302 of the optical resonator is led to the wavelength filter 602 by the optical circulator 601. The wavelength filter 602 has a characteristic wherein the wavelength of the optical signal applied to the planarizing unit is passed and other wavelengths are blocked. Light which has passed through the wavelength filter is applied to Fabry-Perot laser diode 603. The Fabry-Perot laser diode 603 comprises the Fabry-Perot optical resonator and outputs light which has a peak at the same wavelength as the light incident to the wavelength filter 602. Then, light which has passed the wavelength filter 602 is output outside of the planarizing unit by optical circulator 601 as reproduced light.

Although reproduced light can be generated from modulated light in this way, there are instances wherein slow output fluctuation in the reproduced light can be seen. The APC control unit 604 controls the power of the Fabry-Perot laser diode 603 at high-speed to control such output fluctuations.

In addition, it is possible to share the Fabry-Perot laser diode 603 with a plurality of differing wavelengths and generate reproduced light of the respective wavelengths. For example, the construction of a planarizing unit to which optical signals of two wavelengths are applied is as shown in FIG. 7.

Figure 7:
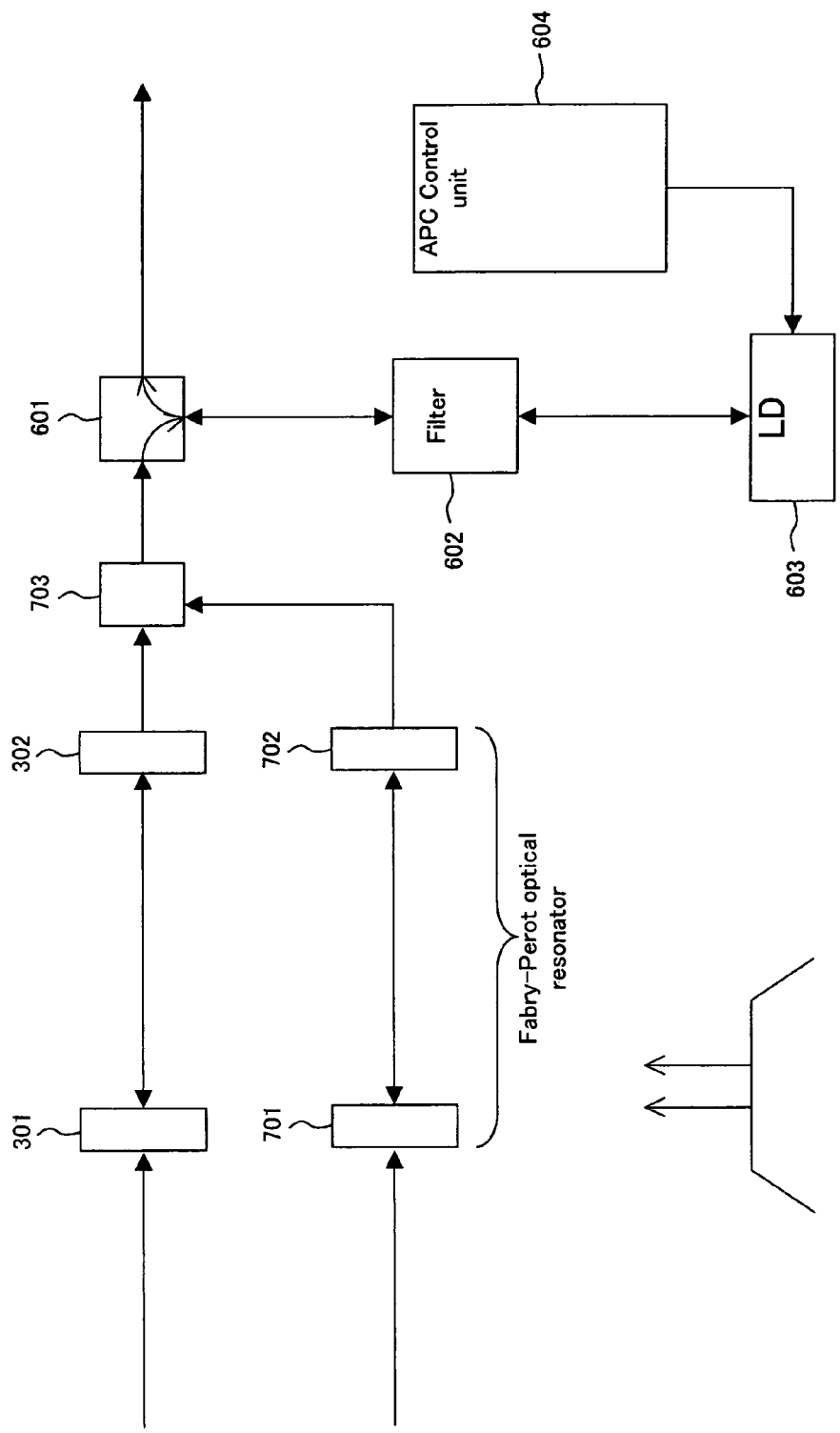
FIG. 7 is a block diagram of a second planarizing unit using laser diode.

The planarizing unit in FIG. 7 has a construction wherein a multiplexer 703 is provided between the mirror 302 and optical circulator 601 in FIG. 6 and a separate Fabry-Perot optical resonator formed by mirrors 701 and 702 is provided on the input-side of the multiplexer 703. In this case, the two Fabry-Perot optical resonators each output CW light of differing wavelengths to the multiplexer 703, and the multiplexer 703 multiplexes these CW lights and outputs this to the optical circulator 601.

Furthermore, by providing a light intensity adjustment unit for every wavelength, the light intensity of a plurality of wavelengths can be equalized. As this light intensity adjustment unit, a VOA (Variable Optical Attenuator), for example, is used. The construction of a planarizing unit for equalizing the light intensity of two wavelengths is as shown in FIG. 8.

Figure 8:
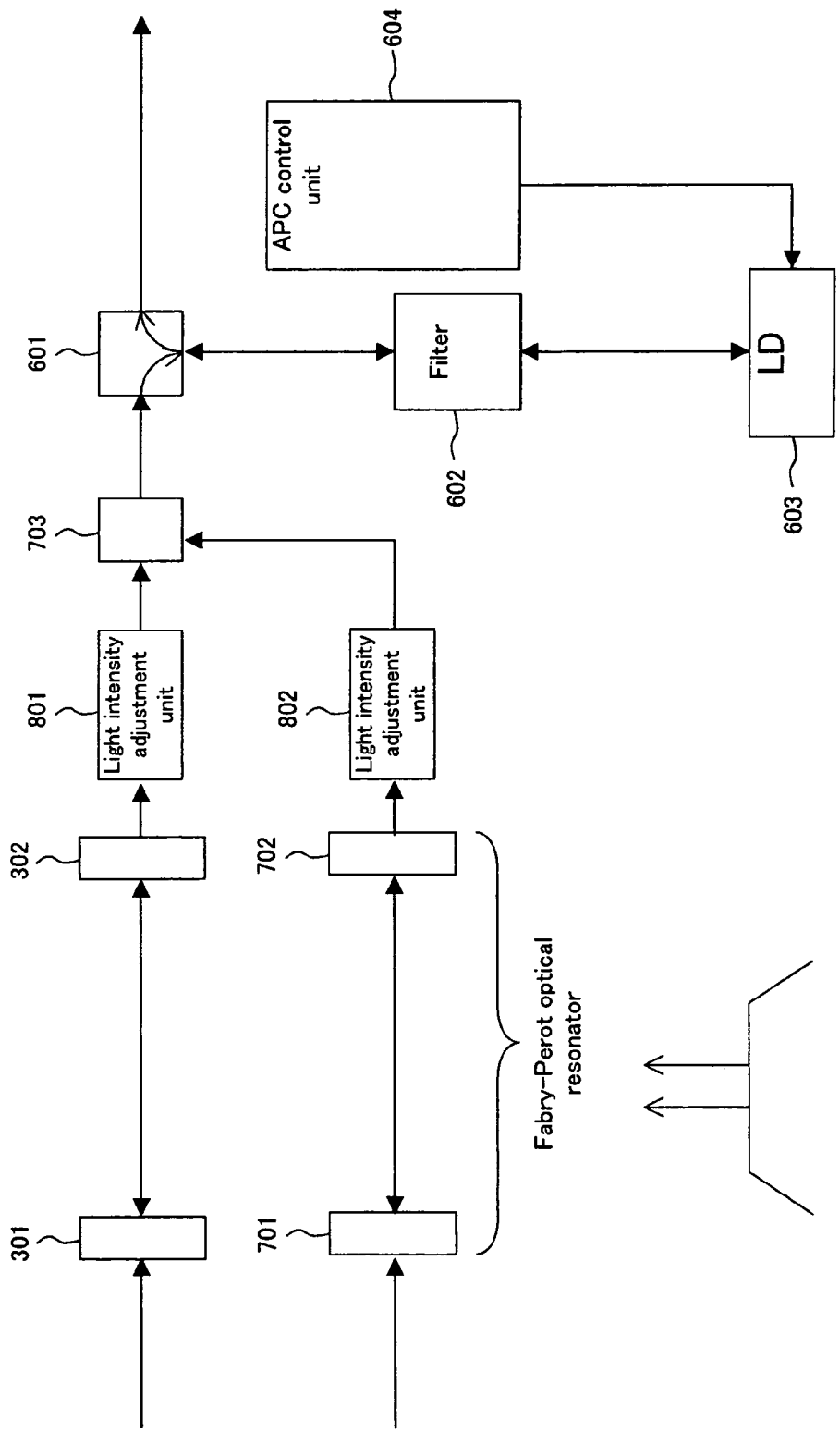
FIG. 8 is a block diagram of a third planarizing unit using laser diode.

The planarizing unit in FIG. 8 has a construction wherein a light intensity adjustment unit 801 is provided between the mirror 302 and the multiplexer 703 and a light intensity adjustment unit 802 is provided between the mirror 702 and the multiplexer 703. In this case, the two Fabry-Perot optical resonators each output CW light of differing wavelengths to the light intensity adjustment units 801 and 802, and the light intensity adjustment units 801 and 802 equalize the light intensity of the respective CW light and outputs these to the multiplexer 703.

Figure 9:
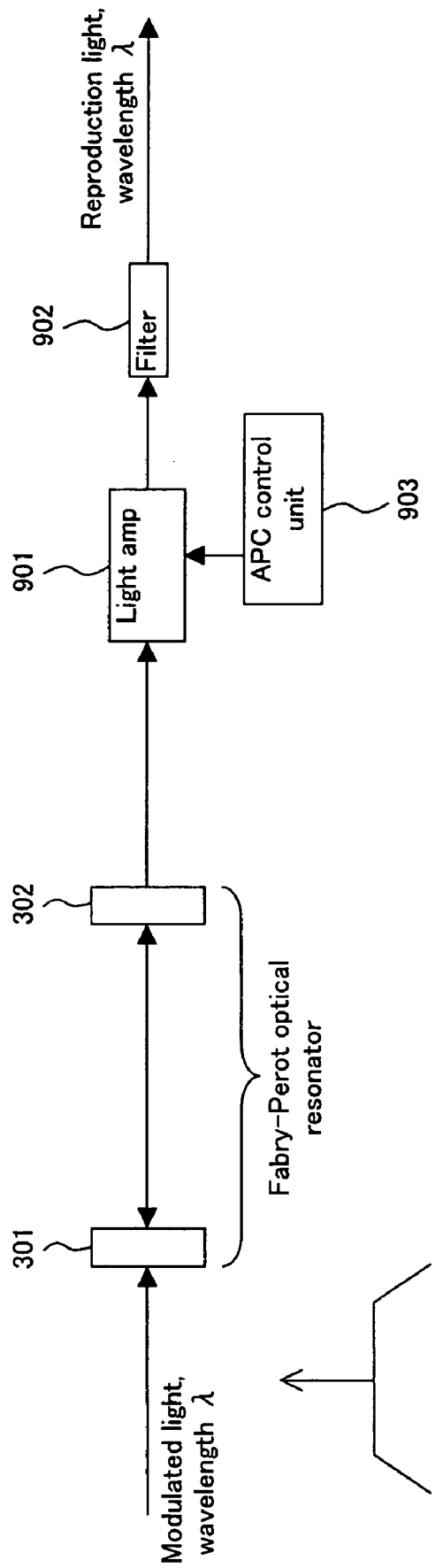
FIG. 9 is a block diagram showing a first planarizing unit using an optical amp.

Although in the constructions shown in FIG. 6 to FIG. 8, light loss is compensated for by using a Fabry-Perot laser diode, a construction wherein light loss is compensated for using an optical amp can also be considered, as shown in FIG. 9.

The planarizing unit in FIG. 9 comprises, in addition to the Fabry-Perot optical resonator in FIG. 3, an optical amp 901, a wavelength filter 902, and an ALC (Automatic Level Control) control unit 903. As the optical amp 901, optical fiber amps such as EDFA and Semiconductor Optical Amplifiers are used, for example.

Light output from the mirror 302 of the optical resonator is applied to the optical amp 901, and the optical amp 901 amplifies this light and outputs it to the wavelength filter 902. The wavelength filter 902 has a characteristic wherein the wavelength of the optical signal applied to the planarizing unit is passed and the other wavelengths are blocked. Light which has passed through the wavelength filter 902 is output outside the planarizing unit as reproduced light. The ALC control unit 903 controls the output level of the optical amp 901 to control fluctuation of the output reproduced light.

Figure 10:
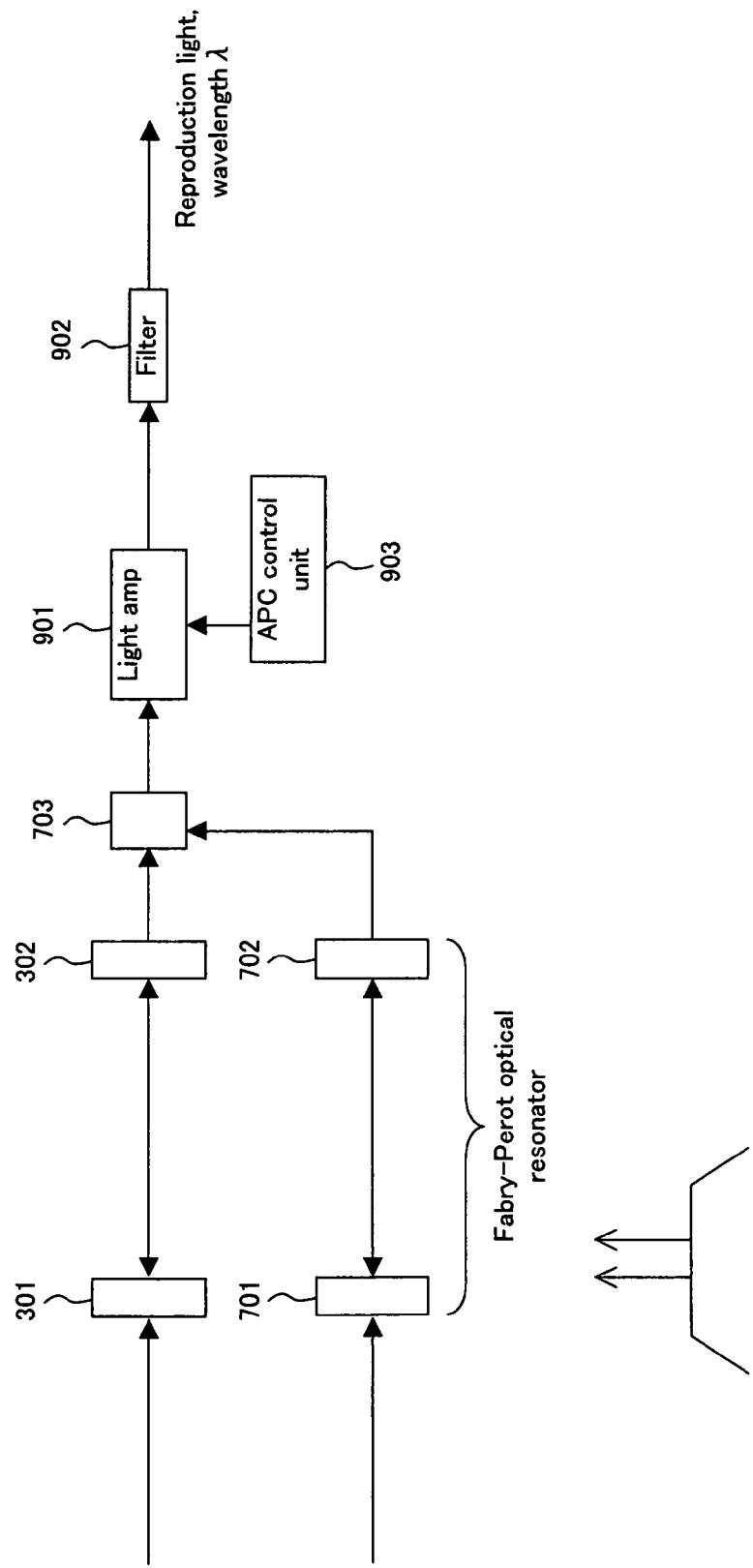
FIG. 10 is a block diagram showing a second planarizing unit using an optical amp.

In addition, it is possible to share the optical amp 901 with a plurality of differing wavelengths and generate reproduced light of the respective wavelengths. For example, the construction of a planarizing unit to which optical signals of two wavelengths are applied is as shown in FIG. 10. The planarizing unit in FIG. 10 has a construction wherein a multiplexer 703 is provided between the mirror 302 and optical amp 901 in FIG. 9 and a separate Fabry-Perot optical resonator formed from mirrors 701 and 702 is provided on the input-side of the multiplexer 703.

Figure 11:
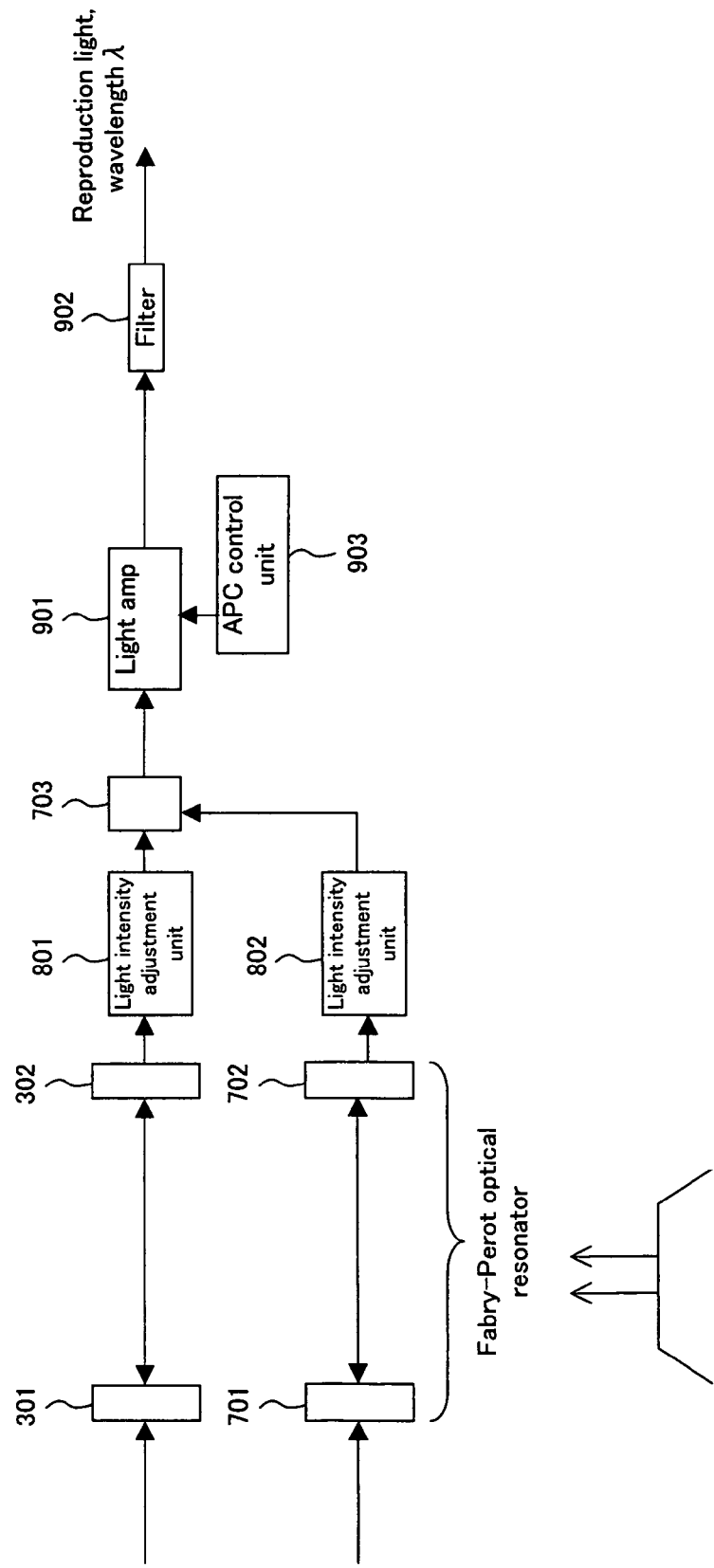
FIG. 11 is a block diagram showing a third planarizing unit using an optical amp.

Furthermore, by providing a light intensity adjustment unit for every wavelength, the light intensity of a plurality of wavelengths can be equalized. For example, the construction of a planarizing unit for equalizing the light intensity of two wavelengths is as shown in FIG. 11. The planarizing unit in FIG. 11 has a construction wherein a light intensity adjustment unit 801 is provided between the mirror 302 and the multiplexer 703 and a light intensity adjustment unit 802 is provided between the mirror 702 and the multiplexer 703.

In the constructions shown in FIG. 9 to FIG. 11, a loop for returning part of the output from the optical amp to the input can be added.

Figure 12:
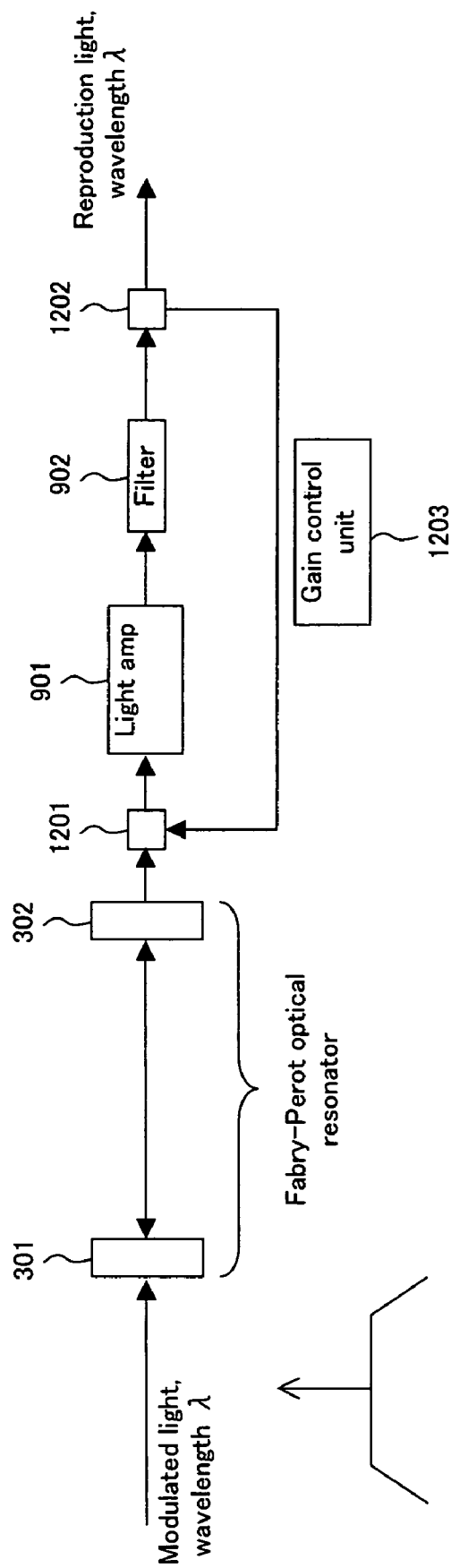
FIG. 12 is a block diagram showing a fourth planarizing unit using an optical amp.

In FIG. 12, a construction wherein a return loop such as this is added to the planarizing unit in FIG. 9 is shown. The planarizing unit in FIG. 12 has a construction wherein a multiplexer 1201 is provided between the mirror 302 and optical amp 901 in FIG. 9, a branching filter 1202 is provided on the output-side of the wavelength filter 902, and the ALC control unit 903 is replaced with a gain control unit 1203.

The multiplexer 1201 multiplexes light output from mirror 302 of the optical resonator and the light output from the branching filter 1202 and outputs it to the optical amp 901. The branching filter 1202 branches light output from the wavelength filter 902 into two, outputs one to the outside of the planarizing unit as reproduced light, and returns the other to the input of the multiplexer 1201. The gain control unit 1203 controls the gain of optical amp 901 to control the fluctuation of the output reproduced light.

Figure 13:
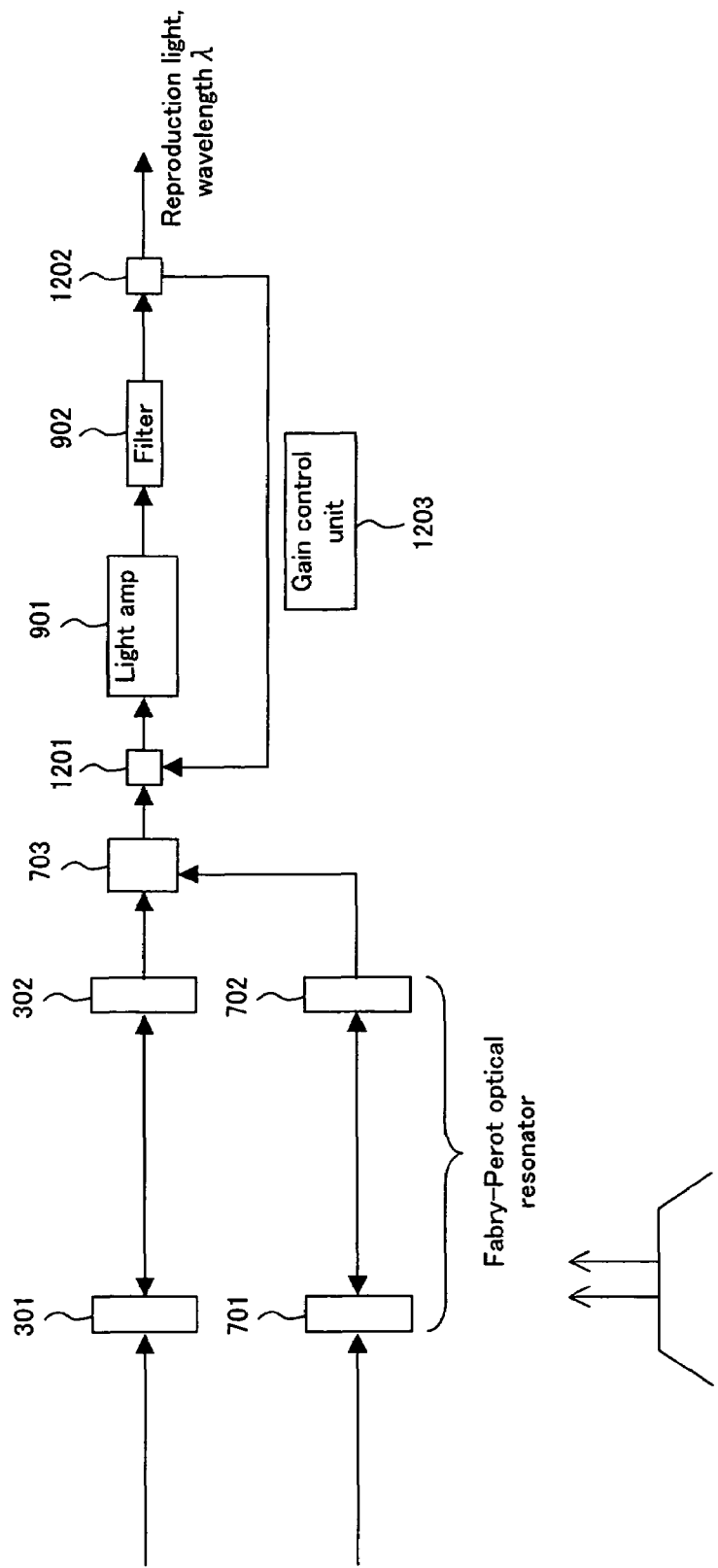
FIG. 13 is a block diagram showing a fifth planarizing unit using an optical amp.
Figure 14:
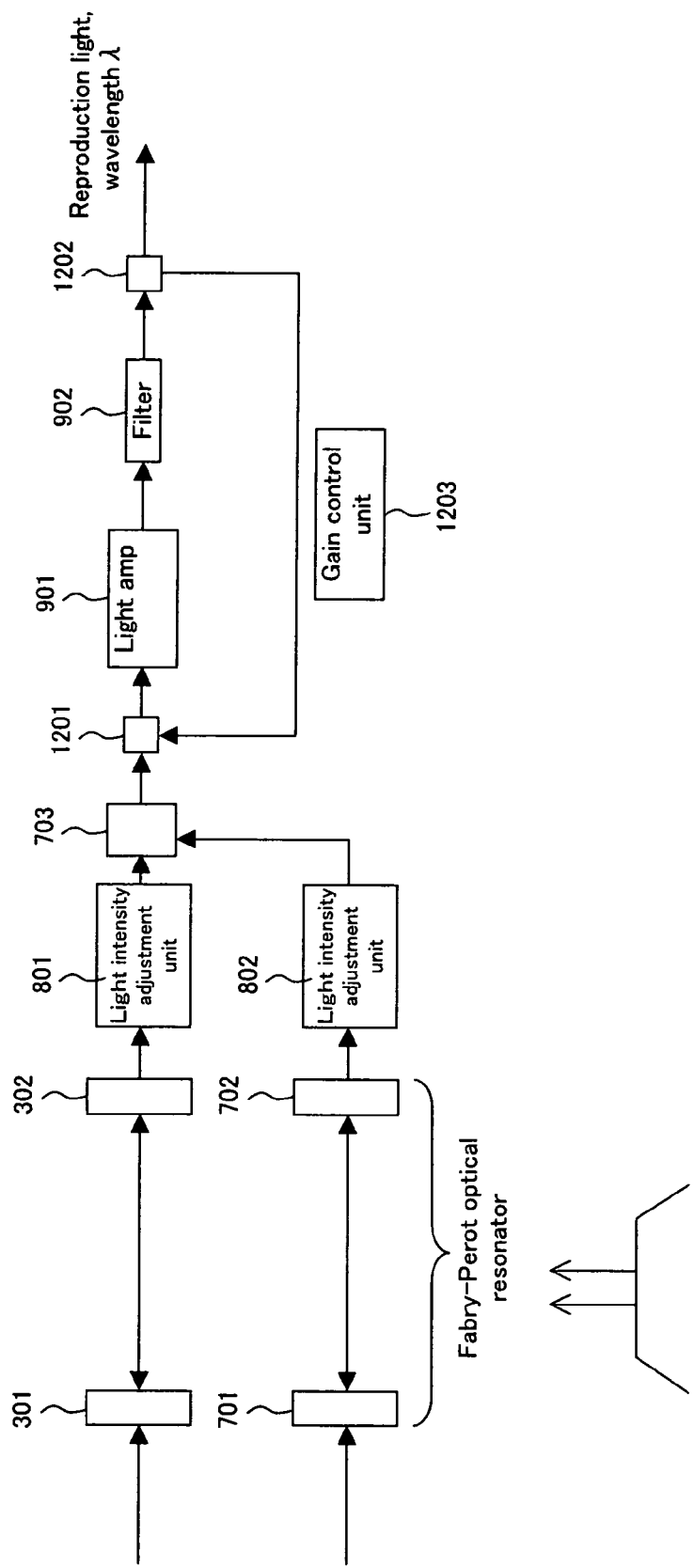
FIG. 14 is a block diagram showing a sixth planarizing unit using an optical amp.

FIG. 13 and FIG. 14 show configurations wherein the same return loop as in FIG. 12 is added to the planarizing unit in FIG. 10 and FIG. 11, respectively. According to a loop configuration such as this, by generating a nonlinear effect such as FWM (Four Wave Mixing), CW light with a wavelength differing from the incident light can be generated. However, in this case, the separation between wavelengths of the generated CW light is sensitively determined by the separation between the wavelengths of the incident light which becomes the reference, and therefore the wavelength of the incident light must be set accurately.

Although in the constructions shown in FIG. 6 to FIG. 14, APC control, ALC control, or gain control is performed to control the fluctuation of the output reproduced light, it is also possible to control output fluctuation using Stimulated Brillouin Scattering (SBS) instead. In this case, the reproduced light generated by the planarizing unit is input to the optical fiber waveguide (optical limiter) generating SBS.

Figure 15:
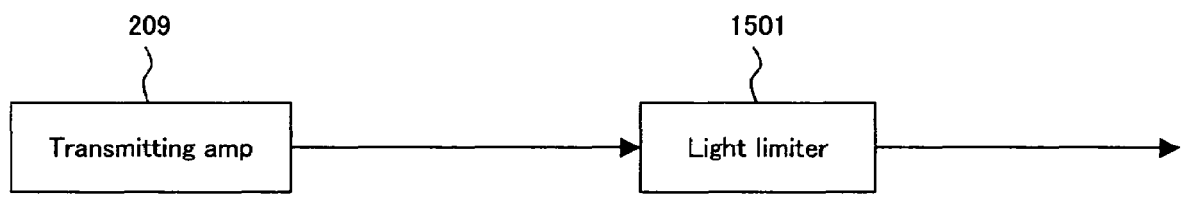
FIG. 15 is a diagram showing a construction using an optical limiter.

FIG. 15 shows a construction using an optical limiter such as this. As an optical limiter 1501, PCF or nonlinear optical fiber (NLPF) and the like which generate SBS at a lower power than a typical optical fiber by reducing the effective cross section (Aeff) and intentionally lowering the SBS threshold value is used.

Reproduced light output from the transmission amp 209 is applied to the optical limiter 1501, and the optical limiter 1501 planarizes incident light by eliminating constant output as returning light.

As explained above, a WDM transmission system wherein a wavelength which has already been used upstream can be reused downstream is actualized by providing a planarizing unit to the transmission device of each station.

Incidentally, when constructing a WDM transmission system such as this, in order to assist reuse of a wavelength downstream even if it is not used by one's own station, all received wavelengths should be passed through. In addition, in regards to light transmitted to one's own station, it should be passed through to assist reuse downstream. At such a time, because a reception wavelength transmitted to one's own station is not required downstream, it can be planarized and passed through or transferred downstream as is and planarized by the station which will use the wavelength.

However, in a system which also supports multi-cast signals, normally, the reception wavelength should be planarized by the station which will be reusing it. In any case, because the planarization unit for reusing modulated light has a construction which oscillates depending on the wavelength of the received light, the entire wavelength band WDM transmitted can be shared.

On the other hand, the wavelength band of the light conversion of the photodiode (PD) used in the receiving unit is sufficiently wide, in comparison to the WDM wavelength band. Therefore, a construction for sharing the receiving unit between a plurality of wavelength ports as needed and a construction for sharing planarizing units and modulators can be achieved.

Figure 16:
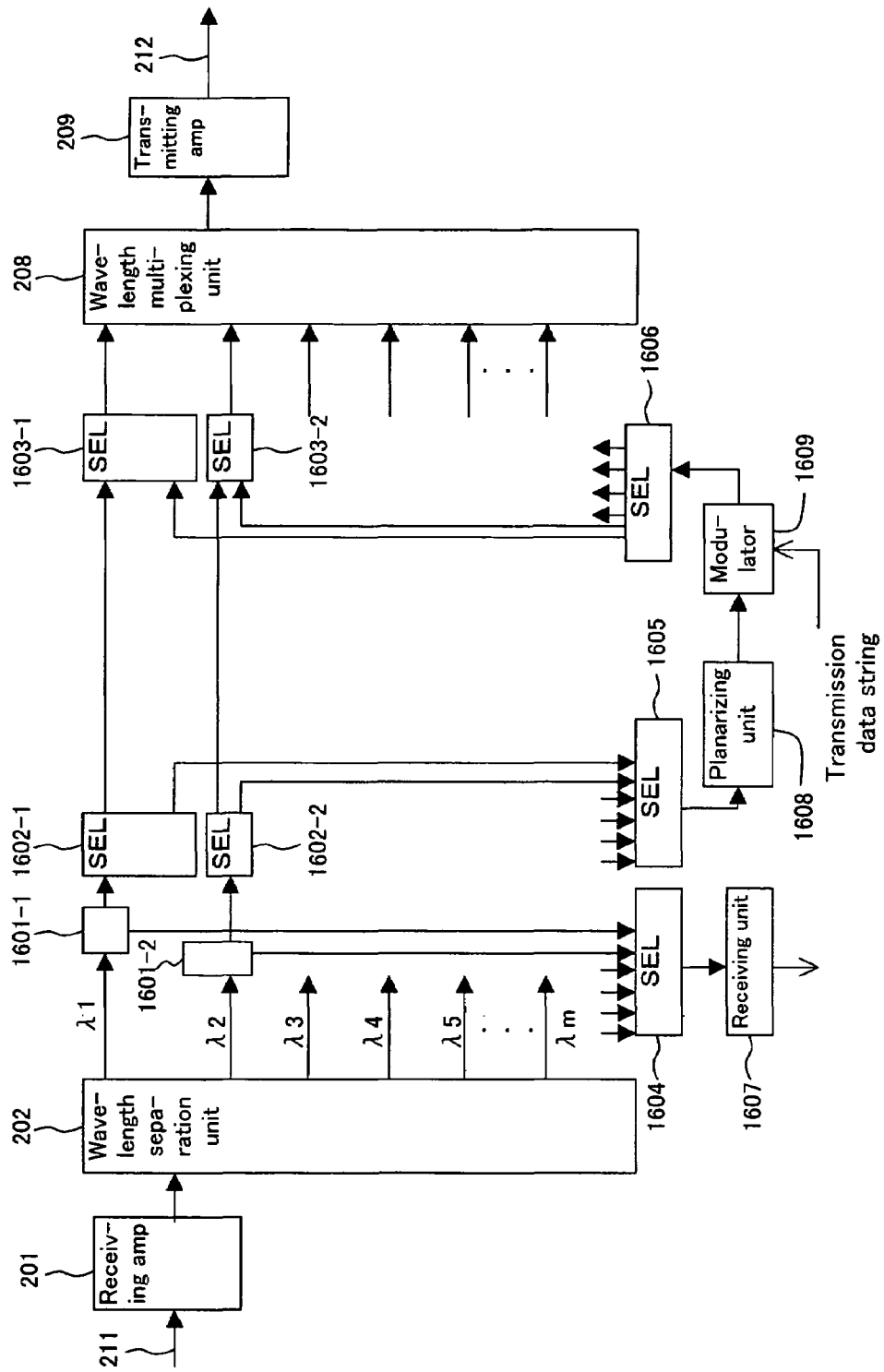
FIG. 16 is a block diagram of a second transmission device.

In FIG. 16, an example configuration of a transmission device such as this is shown. The transmission device in FIG. 16 comprises, in addition to the reception amp 201, wavelength separation unit 202, wavelength multiplexing unit 208, and transmission amp 209 shown in FIG. 2B, optical couplers 1601-1 and 1601-2, selectors 1602-1, 1602-2, 1603-1, 1603-2, 1604, 1605, and 1606, a receiving unit 1607, a planarizing unit 1608, and a modulator 1609.

The optical coupler 1601-1 divides the optical signal of wavelength λ1 output from the wavelength separation unit 202 into two and outputs each to selectors 1602-1 and 1604, respectively. The selector 1602-1 outputs the optical signal from the coupler 1601-1 to selector 1603-1 or 1605. The selector 1603-1 selects the optical signal from the selector 1602-1 or the optical signal from selector 1606 and outputs it to the wavelength multiplexing unit 208.

The operations for the optical coupler 1601-2 and selector 1602-2 and 1603-2 which receives optical signal of wavelength λ2 are the same as that for wavelength λ1. Furthermore, division and selection for optical signals of wavelength λ3 to λm output from the wavelength separation unit 202 are performed by the same configuration as that for wavelength λ1 and wavelength λ2. Therefore, optical signals of wavelength λ3 to λm are applied to selectors 1604 and 1605.

The selector 1604 switches the optical signal from m number of optical couplers including the optical couplers 1601-1 and 1601-2, selects one optical signal, and outputs the signal to the receiving unit 1607. The receiving unit 1607 converts the optical signal from the selector 1604 into an electric signal.

The selector 1605 switches the optical signal from m number of selectors including the selectors 1602-1 and 1602-2, selects one optical signal, and outputs the signal to the planarizing unit 1608. The planarizing unit 1608 averages the amplitude of the optical signal from the selector 1605, generates reproduced light, and outputs the light to the modulator 1609. The modulator 1609 modulates the reproduced light from the planarizing unit 1608 with transmission data strings, generates an optical signal, and outputs the signal to selector 1606.

The selector 1606 outputs the optical signal from the modulator 1609 to the selector of the same wavelength out of m number of selectors including selectors 1603-1 and 1603-2.

In the construction in FIG. 16, although the optical signals of each wavelength are separated using the wavelength separation unit 202, the necessary wavelength can also be selected using a variable wavelength optical filter or the like. As a variable optical wavelength filter, the fiber grating can be implemented, for example.

Figure 17:
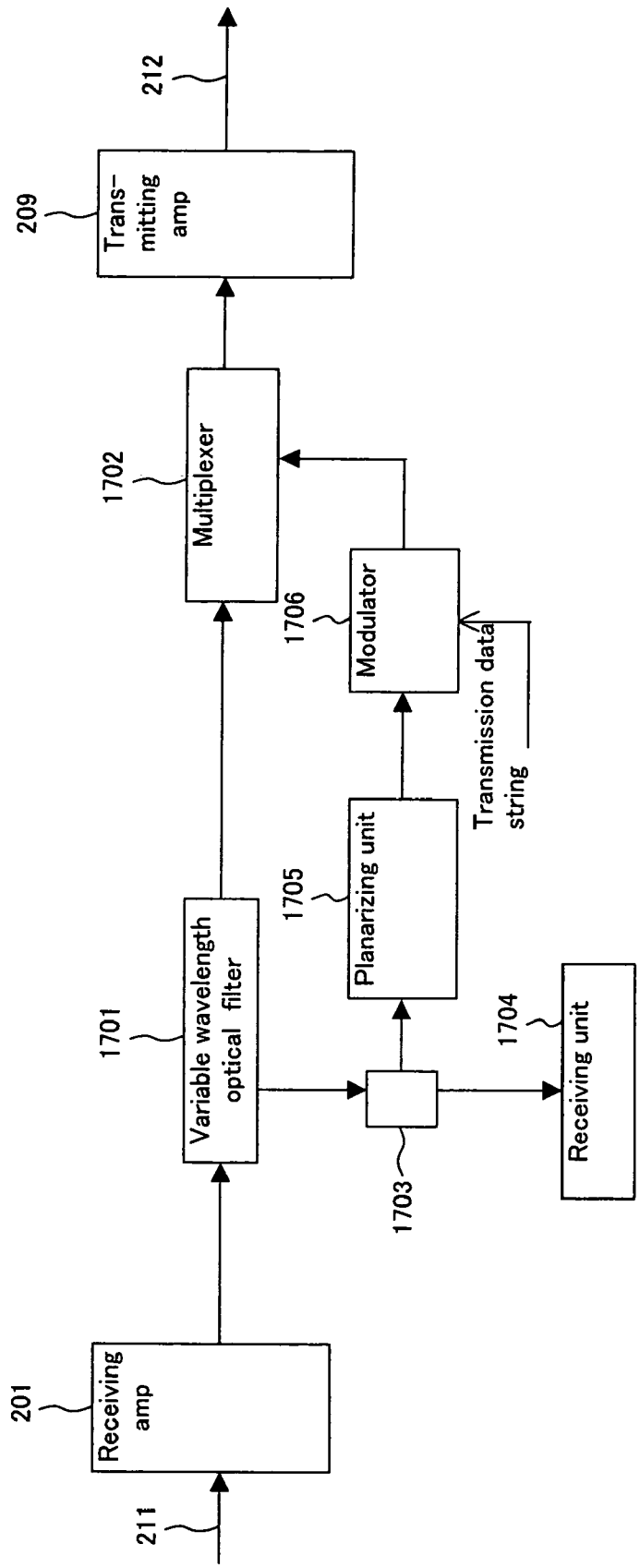
FIG. 17 is a block diagram of a third transmission device.

FIG. 17 shows a construction example of a transmission device such as this. The transmission device in FIG. 17 comprises, in addition to the reception amp 201 and the transmission amp 209 in FIG. 2B, a variable wavelength optical filter 1701, a multiplexer 1702, an optical coupler 1703, a receiving unit 1704, a planarizing unit 1705, and a modulator 1706. An optical coupler or a variable wavelength optical filter is implemented as multiplexer 1702.

The variable optical wavelength filter 1701 extracts the optical signal of the wavelength addressed to the station itself from the WDM light from the reception amp 201, outputs the signal to the optical coupler 1703, and outputs the light of other wavelengths to the multiplexer 1702. The optical coupler 1703 divides the optical signal from the variable optical wavelength filter 1701 into two and outputs each to the receiving unit 1704 and the planarizing unit 1705, respectively.

The receiving unit 1704 converts the optical signal from the optical coupler 1703 into an electrical signal. The planarizing unit 1705 averages the amplitude of the optical signal from the optical coupler 1703, generates reproduced light, and outputs the light to the modulator 1706. The modulator 1706 modulates reproduced light from the planarizing unit 1705 with transmission data strings, generates an optical signal, and outputs the signal to the multiplexer 1702. The multiplexer 1702 multiplexes light from the variable wavelength optical filter 1701 and the optical signal from the modulator 1706 and outputs these to the transmission amp 209.

According to a construction such as this, it is possible to planarize and transmit optical signals addressed to a station itself. In addition, when handling multi-cast signals, a construction such as that in FIG. 18 is used.

Figure 18:
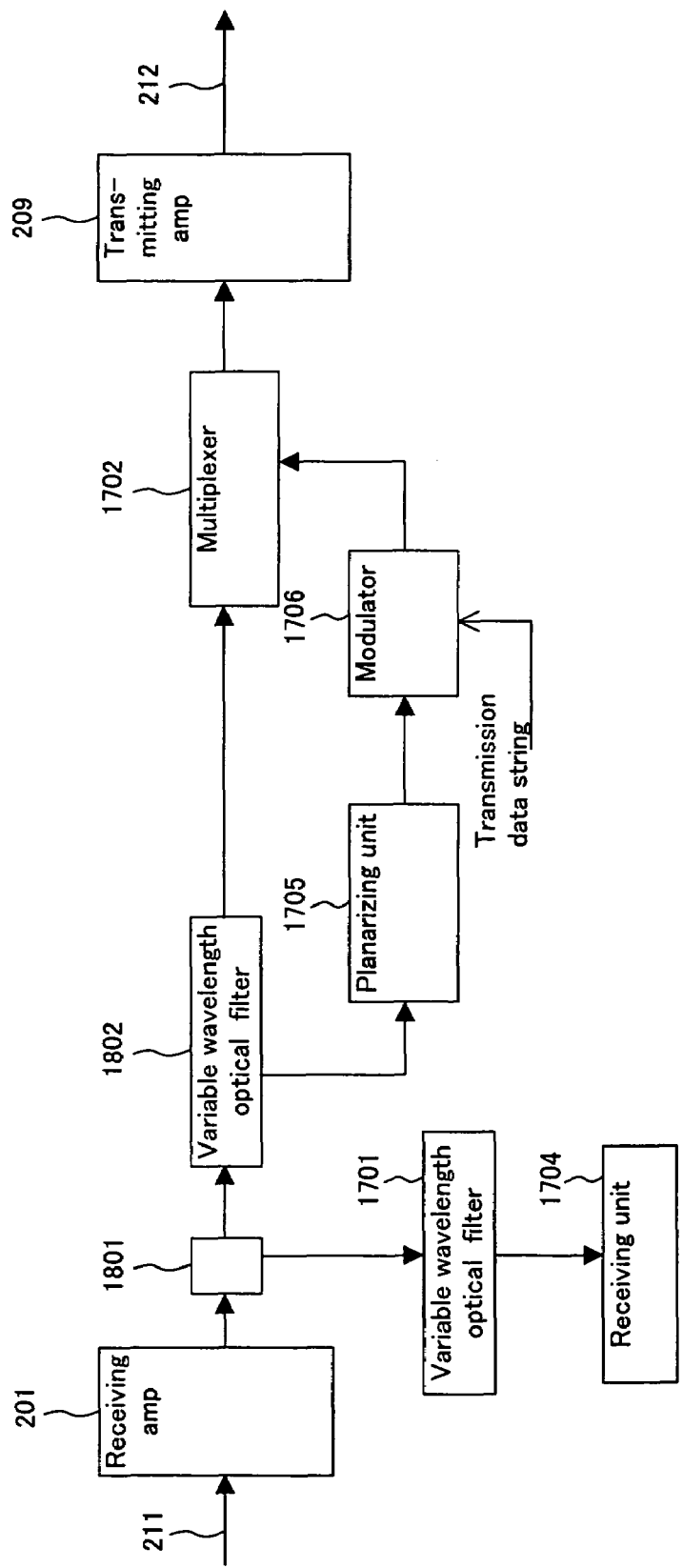
FIG. 18 is a block diagram of a fourth transmission device.

The transmission device in FIG. 18 has a construction wherein the optical coupler 1703 is removed from the construction in FIG. 17 and an optical coupler 1801 and a variable wavelength optical filter 1802 are added.

The optical coupler 1801 splits WDM light from the reception amp 201 in to two and outputs each to the variable wavelength optical filters 1701 and 1802, respectively. The variable wavelength optical filter 1701 extracts the optical signal of the wavelength addressed to the station itself from the WDM light of the optical coupler 1801 and outputs the signal to the receiving unit 1704. The variable wavelength optical filter 1802 extracts the optical signal of the wavelength to be used the station itself from the WDM light of the optical coupler 1801, outputs the signal to the planarizing unit 1705, and outputs the light of other wavelengths to the multiplexer 1702.

Although light to be passed through is transferred downstream as is in the constructions in FIG. 17 and FIG. 18, the optical amp is used frequently in relay transmission. In relay transmission using the optical amp, there are instances wherein reproduction relay is necessary to handle signal deterioration due to transmission. In reproduction relay, after transmitting light for a certain distance, operations are performed to temporarily convert the light to electrical signals and modulate the light once more with the obtained data string.

Figure 19:
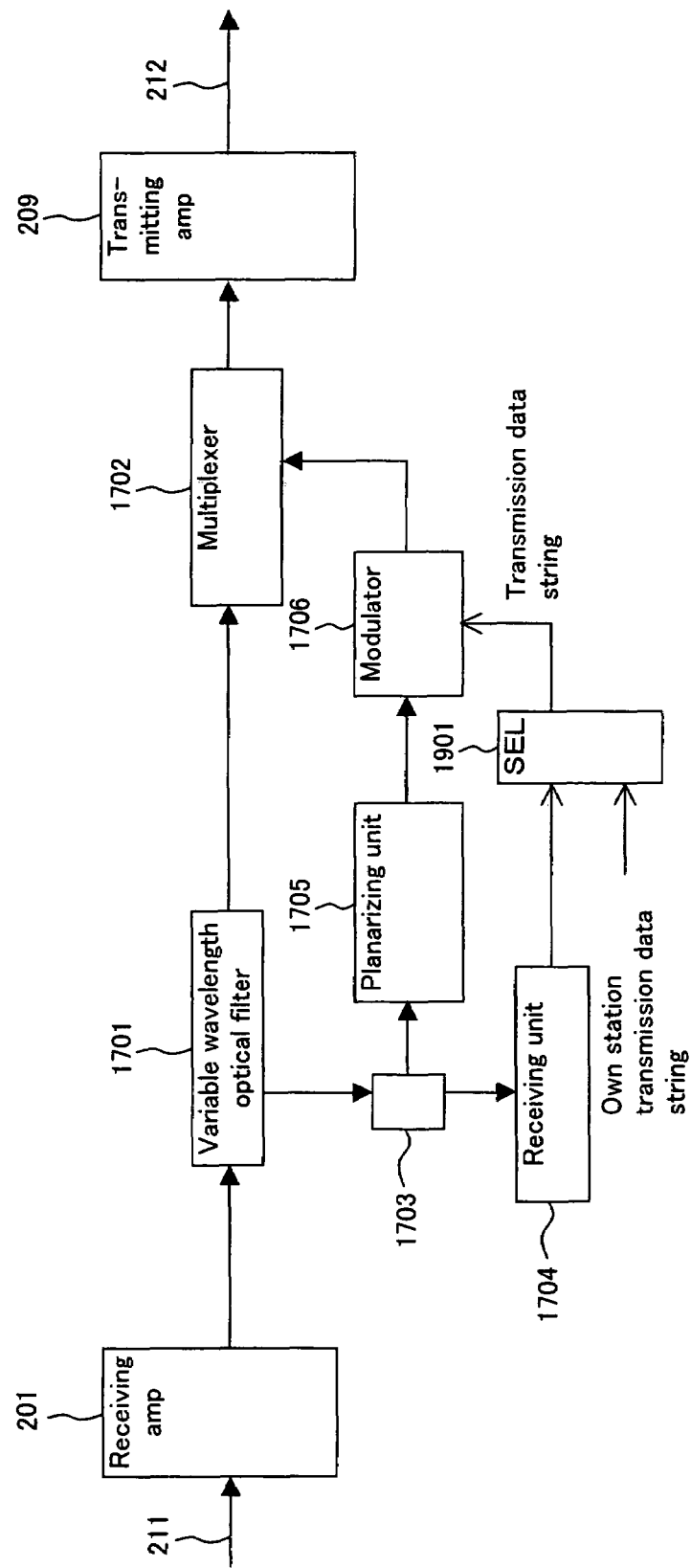
FIG. 19 is a block diagram of a fifth transmission device.
Figure 20:
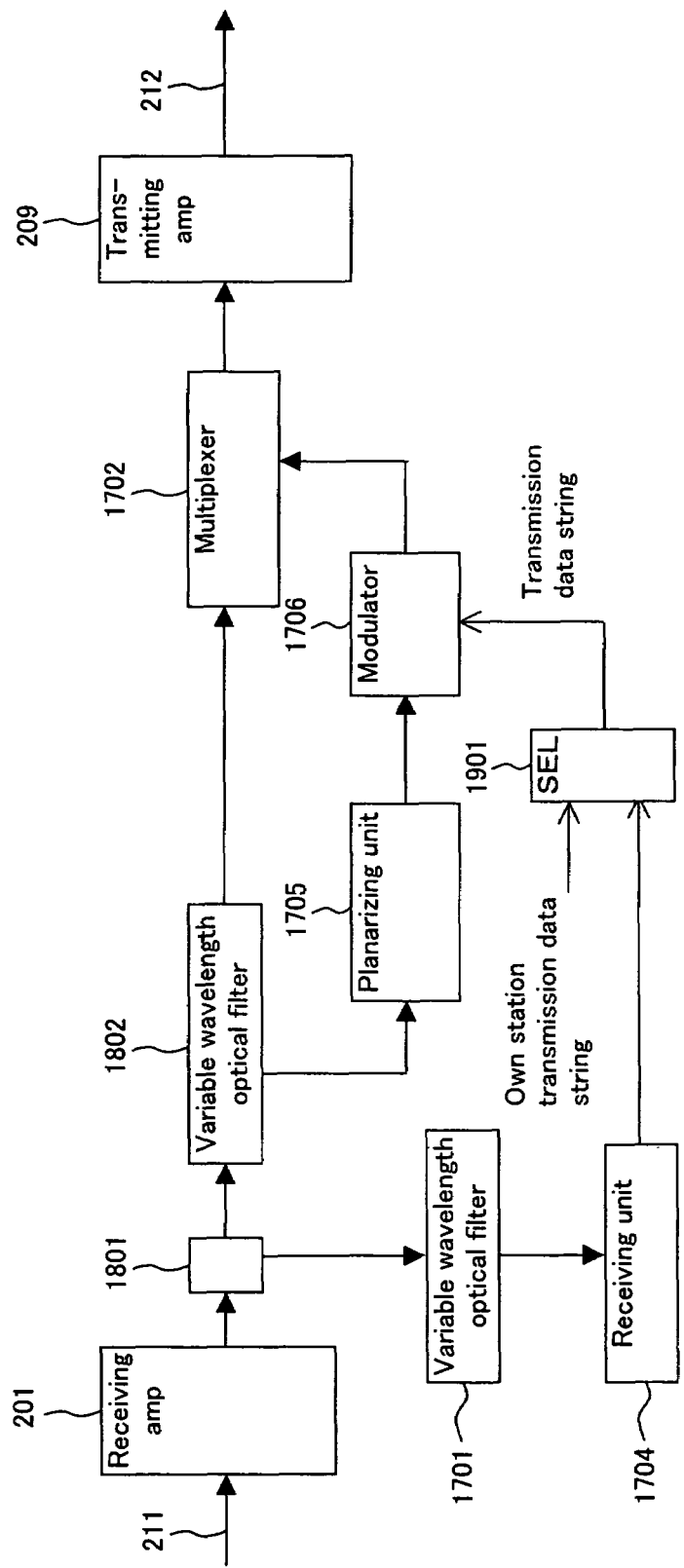
FIG. 20 is a block diagram of a sixth transmission device.

FIG. 19 and FIG. 20 show constructions for performing reproduction relay in the transmission devices of FIG. 17 and FIG. 18, respectively. In both these constructions, a selector 1901 is added.

The selector 1901 switches the received data string obtained from the receiving unit 1704 and the transmission data string of the station itself and outputs either data string to the modulator 1706. The modulator 1706 modulates reproduced light using a data string from the selector 1901 and generates an optical signal.

According to a construction such as this, because not only the transmission data string of the station, but also the reception data string can be sent, it is possible to use the transmission device as a reproduction relay device.

As the planarizing unit 1608 in FIG. 16 and the planarizing unit 1705 in FIG. 17 to FIG. 20, the constructions shown in FIG. 6 to FIG. 14 can be used, for example. In addition, output fluctuation can be controlled by using the optical limiter 1501 shown in FIG. 15 in place of APC control, ALC control, or gain control.

Figure 21:
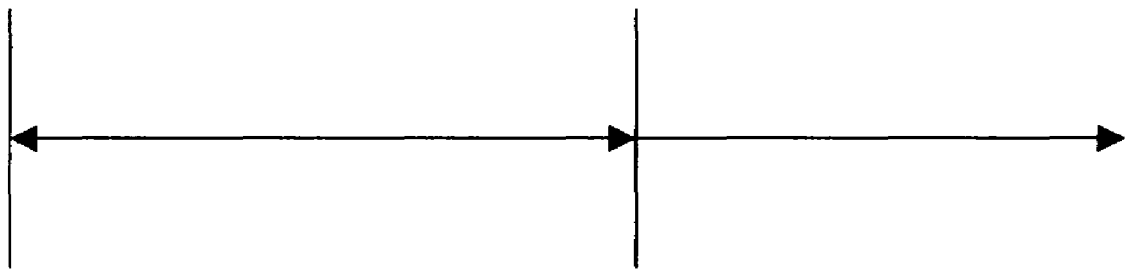
FIG. 21 is a diagram showing a first mirror-shape.
Figure 22:
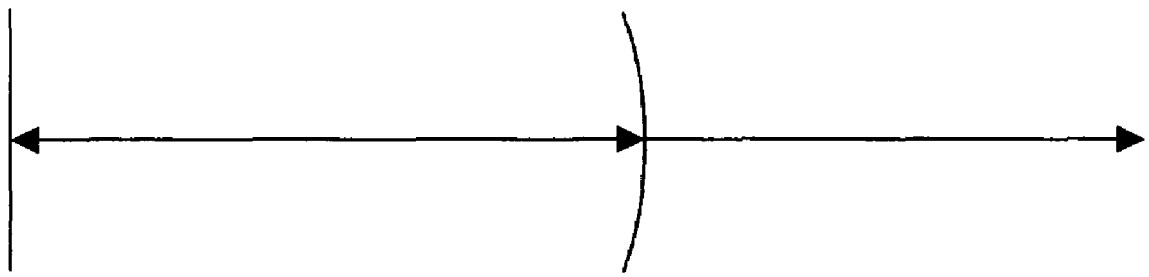
FIG. 22 is a diagram showing a second mirror-shape.
Figure 23:
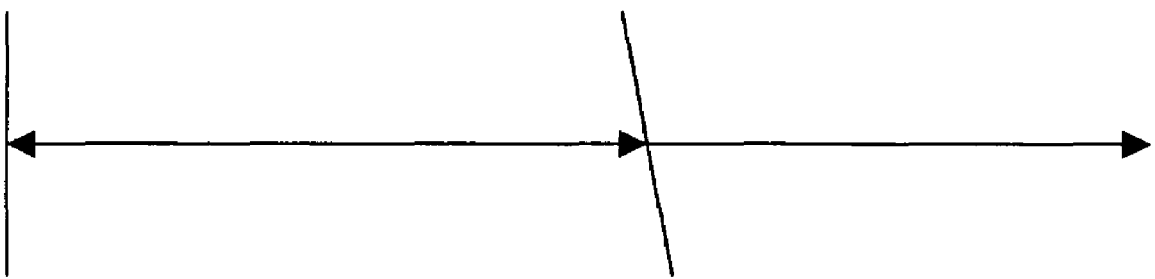
FIG. 23 is a diagram showing a third mirror-shape.
Figure 24:
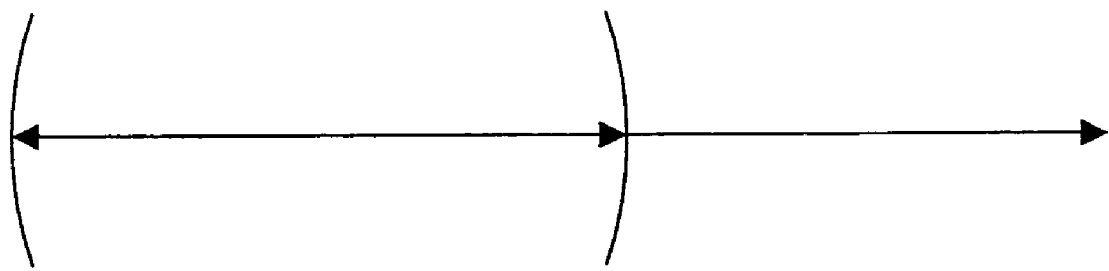
FIG. 24 is a diagram showing a fourth mirror-shape.

Incidentally, it is necessary for the internal optical resonator to be capable of oscillating continuously in the vicinity of the wavelength of the incident light such that the Fabry-Perot laser diode 603 shown in FIG. 6 to FIG. 8 oscillates without fail with light emitted from the outside. Therefore, it is preferable that a structure is implemented wherein the distance between the two mirrors constructing the optical resonator varies continuously. As a result, mirror shapes such as those in FIG. 22, FIG. 23, and FIG. 24 are preferred rather than shapes such as that in FIG. 21.

What is claimed is:

1. An optical apparatus, comprising:
a receiving device configured to receive a wavelength division multiplexed (WDM) light multiplexed by a plurality of optical signals with different wavelengths;
a planarizing device configured to planarize one of the plurality of optical signals of the WDM light and output a planarized light;
a modulation device configured to modulate the planarized light into a modulated optical signal; and
a transmitting device configured to transmit a WDM light including the modulated optical signal,
wherein the planarizing device includes an optical resonator configured to input and resonate the one of the plurality of optical signals, the optical resonator having a peak at a wavelength of the one of the plurality of optical signals,
wherein a laser diode supplies a light which has a peak at substantially the same wavelength with the peak of the optical resonator, and
wherein the optical resonator is a plurality of optical resonators configured to input and resonate several optical signals of the plurality of optical signals of the WDM light and the planarizing device includes a multiplexer configured to multiplex several lights output from the plurality of optical resonators and output the light to the laser diode.

2. An optical apparatus, comprising:
a receiving device configured to receive a wavelength division multiplexed (WDM) light multiplexed by a plurality of optical signals with different wavelengths;
a planarizing device configured to planarize one of the plurality of optical signals of the WDM light and output a planarized light;
a modulation device configured to modulate the planarized light into a modulated optical signal; and
a transmitting device configured to transmit a WDM light including the modulated optical signal,
wherein the planarizing device includes an optical resonator configured to input and resonate the one of the plurality of optical signals, the optical resonator having a peak at a wavelength of the one of the plurality of optical signals, and
wherein the optical resonator is configured to resonate an applied optical signal at a longer period than the wavelength of the optical signal and output light which has a peak at the wavelength of the signal and the planarizing device includes an optical fiber amplifier configured to output light which has a peak at the same wavelength as the light output from the optical resonator.

3. The optical apparatus according to claim 2 further comprising an optical limiter configured to control output fluctuation by generating Stimulated Brillouin Scattering of the WDM light comprising the modulated optical signal.

4. The optical apparatus according to claim 2 further comprising a selection device configured to select an optical signal of one wavelength out of the plurality of optical signals of the WDM light and to output the optical signal to the planarizing device and a multiplexing device configured to multiplex the optical signal output from the modulation device with optical signals which have not been selected and output the signal to the transmitting device.

5. The optical apparatus according to claim 2 further comprising a conversion device configured to convert several optical signals of the plurality of optical signals of the WDM light into several electrical signals and generating a reception data string, wherein the modulation device modulates the planarized light using the reception data string as A transmission data string.

6. An optical apparatus, comprising:
a receiving device configured to receive a wavelength division multiplexed (WDM) light multiplexed by a plurality of optical signals with different wavelengths;
a planarizing device configured to planarize one of the plurality of optical signals of the WDM light and output a planarized light;
a modulation device configured to modulate the planarized light into a modulated optical signal; and
a transmitting device configured to transmit a WDM light including the modulated optical signal,
wherein the planarizing device includes an optical resonator configured to input and resonate the one of the plurality of optical signals, the optical resonator having a peak at a wavelength of the one of the plurality of optical signals,
wherein the optical resonator is configured to resonate an applied optical signal at a longer period than the wavelength of the optical signal and output light which has a peak at the wavelength of the signal and the planarizing device includes an optical amplifier configured to output light which has a peak at the same wavelength as the light output from the optical resonator, and
wherein the optical resonator is a plurality of optical resonators configured to input and resonate several optical signals of the plurality of optical signals of the WDM light and the planarizing device includes a multiplexer configured to multiplex several lights output from the plurality of optical resonators and output the light to the optical amplifier.

7. An optical apparatus, comprising:
a receiving device configured to receive a wavelength division multiplexed (WDM) light multiplexed by a plurality of optical signals with different wavelengths;
a planarizing device configured to planarize one of the plurality of optical signals of the WDM light and output a planarized light;
a modulation device configured to modulate the planarized light into a modulated optical signal; and
a transmitting device configured to transmit a WDM light including the modulated optical signal,
wherein the planarizing device includes an optical resonator configured to input and resonate the one of the plurality of optical signals, the optical resonator having a peak at a wavelength of the one of the plurality of optical signals,
wherein the optical resonator is configured to resonate an applied optical signal at a longer period than the wavelength of the optical signal and output light which has a peak at the wavelength of the signal and the planarizing device includes an optical amplifier configured to output light which has a peak at the same wavelength as the light output from the optical resonator, and
wherein the planarizing device includes a loop configured to return a part of the output from the optical amplifier to the input of the optical amplifier.

8. A method comprising:
receiving a wavelength division multiplexed (WDM) light multiplexed by a plurality of optical signals with different wavelengths;
planarizing one of the plurality of optical signals of the WDM light and outputting a planarized light; and
modulating the planarized light into a modulated optical signal,
wherein the planarizing operation includes inputting and resonating the one of the plurality of optical signals and the resonating is at a peak at a wavelength of the one of the plurality of optical signals, and
wherein the resonating operation resonates an applied optical signal at a longer period than the wavelength of the optical signal and outputs light which has a peak at the wavelength of the signal and the planarizing operation includes outputting light which has a peak at the same wavelength as the light output from the resonating operation through an optical fiber amplifier.

* * * * *

UNITED STATES PATENT AND TRADEMARK OFFICE
CERTIFICATE OF CORRECTION

| | | |
|---|---|---|
| PATENT NO. | : 7,725,040 B2 | Page 1 of 1 |
| APPLICATION NO. | : 11/239055 | |
| DATED | : May 25, 2010 | |
| INVENTOR(S) | : Futoshi Izumi | |

It is certified that error appears in the above-identified patent and that said Letters Patent is hereby corrected as shown below:

Column 13, Line 8 delete "A" after "as" and insert --a--.

Signed and Sealed this

Fourteenth Day of September, 2010

David J. Kappos
*Director of the United States Patent and Trademark Office*